US011038628B2

(12) United States Patent
Deogun et al.

(10) Patent No.: US 11,038,628 B2
(45) Date of Patent: Jun. 15, 2021

(54) PROCEDURES FOR CONFIGURED GRANTS

(71) Applicant: QUALCOMM Incorporated, San Diego, CA (US)

(72) Inventors: Pravjyot Singh Deogun, Bengaluru (IN); Xiaoxia Zhang, San Diego, CA (US); Ozcan Ozturk, San Diego, CA (US); Kapil Bhattad, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/800,768

(22) Filed: Feb. 25, 2020

(65) Prior Publication Data
US 2020/0351030 A1 Nov. 5, 2020

(30) Foreign Application Priority Data

May 4, 2019 (IN) .............................. 201941017882

(51) Int. Cl.
*H04W 56/00* (2009.01)
*H04L 1/18* (2006.01)
(Continued)

(52) U.S. Cl.
CPC .......... *H04L 1/1819* (2013.01); *H04L 5/0055* (2013.01); *H04W 16/14* (2013.01); *H04W 72/14* (2013.01); *H04W 74/0808* (2013.01)

(58) Field of Classification Search
CPC .... H04L 1/1819; H04L 5/0055; H04W 16/14; H04W 72/14; H04W 74/0808
(Continued)

(56) References Cited

U.S. PATENT DOCUMENTS

2010/0077272 A1\* 3/2010 Peisa ..................... H04L 1/1887
714/748
2016/0183276 A1\* 6/2016 Marinier ............... H04W 72/12
370/329
(Continued)

FOREIGN PATENT DOCUMENTS

| EP | 3291597 A1 | 3/2018 |
| WO | WO-2018027656 A1 | 2/2018 |
| WO | WO-2019030726 A1 | 2/2019 |

OTHER PUBLICATIONS

International Search Report and Written Opinion—PCT/US2020/019958—ISA/EPO—dated Sep. 9, 2020.
(Continued)

*Primary Examiner* — Sai Ming Chan
(74) *Attorney, Agent, or Firm* — Holland & Hart LLP/Qualcomm

(57) ABSTRACT

Techniques are described herein for improved methods, systems, devices, and apparatuses that support procedures for configured grants. Generally, the described techniques may relate to restricting a number of retransmissions used during a hybrid automatic repeat request (HARQ) process or managing potential scheduling conflicts for the HARQ process from dynamic grants and configured grants. A device (e.g., a user equipment) may initiate a timer or a counter associated with a HARQ process for indicating that transmission attempts for the HARQ process are permitted. The device may identify a transmission occasion of a configured grant in an unlicensed frequency spectrum band that is associated with the HARQ process and may determine that the timer associated with the HARQ process is active. The device may perform a transmission attempt over the transmission occasion of the configured grant based on determining that the timer is active.

31 Claims, 17 Drawing Sheets

(51) Int. Cl.
   *H04W 74/08* (2009.01)
   *H04L 5/00* (2006.01)
   *H04W 16/14* (2009.01)
   *H04W 72/14* (2009.01)

(58) Field of Classification Search
   USPC .......................................................... 370/329
   See application file for complete search history.

(56) References Cited

U.S. PATENT DOCUMENTS

| | | | | |
|---|---|---|---|---|
| 2018/0042043 | A1* | 2/2018 | Babaei | H04W 72/1289 |
| 2019/0075589 | A1* | 3/2019 | Jeon | H04W 72/1278 |
| 2019/0150184 | A1* | 5/2019 | Golitschek Edler von Elbwart | H04W 8/24 370/329 |
| 2019/0253201 | A1* | 8/2019 | Ye | H04W 76/11 |
| 2019/0289638 | A1* | 9/2019 | Kung | H04L 1/1887 |
| 2020/0053779 | A1* | 2/2020 | Jeon | H04B 7/0695 |
| 2020/0107377 | A1* | 4/2020 | Lee | H04W 72/042 |
| 2020/0146034 | A1* | 5/2020 | Bagheri | H04W 72/14 |
| 2020/0177318 | A1 | 6/2020 | Belleschi et al. | |

OTHER PUBLICATIONS

Huawei, et al., "Transmission with Configured Grant in NR Unlicensed Band," 3GPP Draft, 3GPP TSG RAN WG1 Meeting #96bis, R1-1903931, 3rd Generation Partnership Project (3GPP), Mobile Competence Centre, 650, Route Des Lucioles, F-06921, Sophia-Antipolis Cedex, France, vol. RAN WG1, No. Xi 'an, China; Apr. 8, 2019-Apr. 12, 2019, Apr. 7, 2019 (Apr. 7, 2019), XP051699364, 19 pages, Retrieved from the Internet:URL:http://www.3gpp.org/ftp/Meetings%5F3GPP%5FSYNC/RAN1/Docs/R1%2D1903931%2Ezip [retrieved on Apr. 7, 2019], sections 3.1 and 3.2.

Intel Corporation: "Enhancements to Configured Grants for NR-unlicensed," 3GPP Draft, 3GPP TSG RAN WG1 Meeting #96b, R1-1904288—INTEL—Enhancements to Configured Grants for NR-unlicensed, 3rd Generation Partnership Project (3GPP), Mobile Competence Centre, 650, Route Des Lucioles, F-06921, Sophia-Antipolis Cedex, France, vol. RAN WG1, No. Xi'an, China; Apr. 8, 2019-Apr. 12, 2019, Apr. 7, 2019 (Apr. 7, 2019), XP051699604, 8 pages, Retrieved from the Internet: URL: http://www.3gpp.org/ftp/Meetings%5F3GPP%5FSYNC/RAN1/Docs/R1%2D1904288%2Ezip [retrieved on Apr. 7, 2019], section 2.5.

Partial International Search Report—PCT/US2020/019958—ISA/EPO—dated Jun. 15, 2020.

* cited by examiner

PROCEDURES FOR CONFIGURED GRANTS

CROSS REFERENCE

The present application for patent claims the benefit of India Provisional Patent Application No. 201941017882 by DEOGUN et al., entitled "PROCEDURES FOR CONFIGURED GRANTS," filed May 4, 2019, assigned to the assignee hereof, and expressly incorporated by reference herein.

BACKGROUND

The following relates generally to wireless communications, and more specifically to procedures for configured grants.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communications systems may use configured grants to allow a UE grantless-access to uplink resources. Uplink transmissions communicated using configured grants may use hybrid automatic repeat request (HARQ) processes to improve reliability. Improved techniques for operations related to HARQ processes are desired.

SUMMARY

The described techniques relate to improved methods, systems, devices, and apparatuses that support procedures for configured grants. Generally, the described techniques may relate to a device (e.g., a user equipment (UE)) initiating a timer associated with a hybrid automatic repeat request (HARQ) process for indicating that transmission attempts for the HARQ process are permitted, identifying a transmission occasion of a configured grant in an unlicensed frequency spectrum band that is associated with the HARQ process, determining that the timer associated with the HARQ process is active, and performing a transmission attempt over the transmission occasion of the configured grant based on determining that the timer is active, where the transmission attempt may include a successful transmission or an unsuccessful transmission. Some techniques may relate to a device (e.g., a UE) determining that a counter associated with a HARQ process satisfies a threshold, and performing a transmission attempt over a transmission occasion of a configured grant based on determining that the counter satisfies the threshold. Some techniques may relate to a device (e.g., a base station) receiving a transmission over a transmission opportunity of a configured grant in an unlicensed frequency spectrum band that is associated with a HARQ process, identifying that the transmission is a last transmission of the HARQ process received, initiating a timer based on identifying that the transmission is the last transmission of the HARQ process received, and scheduling a retransmission of the transmission of a HARQ from the HARQ process based on the timer being active.

A method of wireless communication is described. The method may include initiating a timer associated with a hybrid automatic repeat request process for indicating that transmission attempts for a transport block of the hybrid automatic repeat request process are permitted, identifying a transmission occasion of a configured grant in an unlicensed frequency spectrum band that is associated with the hybrid automatic repeat request process, determining that the timer associated with the hybrid automatic repeat request process is active, and performing a transmission attempt of the transport block over the transmission occasion of the configured grant based on determining that the timer is active.

An apparatus for wireless communication is described. The apparatus may include a processor, memory in electronic communication with the processor, and instructions stored in the memory. The instructions may be executable by the processor to cause the apparatus to initiate a timer associated with a hybrid automatic repeat request process for indicating that transmission attempts for a transport block of the hybrid automatic repeat request process are permitted, identify a transmission occasion of a configured grant in an unlicensed frequency spectrum band that is associated with the hybrid automatic repeat request process, determine that the timer associated with the hybrid automatic repeat request process is active, and perform a transmission attempt of the transport block over the transmission occasion of the configured grant based on determining that the timer is active.

Another apparatus for wireless communication is described. The apparatus may include means for initiating a timer associated with a hybrid automatic repeat request process for indicating that transmission attempts for a transport block of the hybrid automatic repeat request process are permitted, identifying a transmission occasion of a configured grant in an unlicensed frequency spectrum band that is associated with the hybrid automatic repeat request process, determining that the timer associated with the hybrid automatic repeat request process is active, and performing a transmission attempt of the transport block over the transmission occasion of the configured grant based on determining that the timer is active.

A non-transitory computer-readable medium storing code for wireless communication is described. The code may include instructions executable by a processor to initiate a timer associated with a hybrid automatic repeat request process for indicating that transmission attempts for a transport block of the hybrid automatic repeat request process are permitted, identify a transmission occasion of a configured grant in an unlicensed frequency spectrum band that is associated with the hybrid automatic repeat request process, determine that the timer associated with the hybrid automatic repeat request process is active, and perform a transmission attempt of the transport block over the transmission occasion of the configured grant based on determining that the timer is active.

A method of wireless communication is described. The method may include initiating a counter associated with a hybrid automatic repeat request process for indicating that transmission attempts for a transport block of the hybrid automatic repeat request process are permitted, identifying a transmission occasion of a configured grant in an unlicensed frequency spectrum band that is associated with the hybrid automatic repeat request process, determining that the counter associated with the hybrid automatic repeat request process satisfies a threshold, and performing a transmission attempt of the transport block over the transmission occasion of the configured grant based on determining that the counter satisfies the threshold.

An apparatus for wireless communication is described. The apparatus may include a processor, memory in electronic communication with the processor, and instructions stored in the memory. The instructions may be executable by the processor to cause the apparatus to initiate a counter associated with a hybrid automatic repeat request process for indicating that transmission attempts for a transport block of the hybrid automatic repeat request process are permitted, identify a transmission occasion of a configured grant in an unlicensed frequency spectrum band that is associated with the hybrid automatic repeat request process, determine that the counter associated with the hybrid automatic repeat request process satisfies a threshold, and perform a transmission attempt of the transport block over the transmission occasion of the configured grant based on determining that the counter satisfies the threshold.

Another apparatus for wireless communication is described. The apparatus may include means for initiating a counter associated with a hybrid automatic repeat request process for indicating that transmission attempts for a transport block of the hybrid automatic repeat request process are permitted, identifying a transmission occasion of a configured grant in an unlicensed frequency spectrum band that is associated with the hybrid automatic repeat request process, determining that the counter associated with the hybrid automatic repeat request process satisfies a threshold, and performing a transmission attempt of the transport block over the transmission occasion of the configured grant based on determining that the counter satisfies the threshold.

A non-transitory computer-readable medium storing code for wireless communication is described. The code may include instructions executable by a processor to initiate a counter associated with a hybrid automatic repeat request process for indicating that transmission attempts for a transport block of the hybrid automatic repeat request process are permitted, identify a transmission occasion of a configured grant in an unlicensed frequency spectrum band that is associated with the hybrid automatic repeat request process, determine that the counter associated with the hybrid automatic repeat request process satisfies a threshold, and perform a transmission attempt of the transport block over the transmission occasion of the configured grant based on determining that the counter satisfies the threshold.

A method of wireless communication at a base station is described. The method may include receiving, from a user equipment, a transmission over a transmission opportunity of a configured grant in an unlicensed frequency spectrum band that is associated with a hybrid automatic repeat request process, identifying that the transmission is a last transmission of the hybrid automatic repeat request process received from the user equipment, initiating a timer based on identifying that the transmission is the last transmission of the hybrid automatic repeat request process received from the user equipment, and scheduling a retransmission of the transmission of a hybrid automatic repeat request from the hybrid automatic repeat request process based on the timer being active.

An apparatus for wireless communication at a base station is described. The apparatus may include a processor, memory in electronic communication with the processor, and instructions stored in the memory. The instructions may be executable by the processor to cause the apparatus to receive, from a user equipment, a transmission over a transmission opportunity of a configured grant in an unlicensed frequency spectrum band that is associated with a hybrid automatic repeat request process, identify that the transmission is a last transmission of the hybrid automatic repeat request process received from the user equipment, initiate a timer based on identifying that the transmission is the last transmission of the hybrid automatic repeat request process received from the user equipment, and schedule a retransmission of the transmission of a hybrid automatic repeat request from the hybrid automatic repeat request process based on the timer being active.

Another apparatus for wireless communication at a base station is described. The apparatus may include means for receiving, from a user equipment, a transmission over a transmission opportunity of a configured grant in an unlicensed frequency spectrum band that is associated with a hybrid automatic repeat request process, identifying that the transmission is a last transmission of the hybrid automatic repeat request process received from the user equipment, initiating a timer based on identifying that the transmission is the last transmission of the hybrid automatic repeat request process received from the user equipment, and scheduling a retransmission of the transmission of a hybrid automatic repeat request from the hybrid automatic repeat request process based on the timer being active.

A non-transitory computer-readable medium storing code for wireless communication at a base station is described. The code may include instructions executable by a processor to receive, from a user equipment, a transmission over a transmission opportunity of a configured grant in an unlicensed frequency spectrum band that is associated with a hybrid automatic repeat request process, identify that the transmission is a last transmission of the hybrid automatic repeat request process received from the user equipment, initiate a timer based on identifying that the transmission is the last transmission of the hybrid automatic repeat request process received from the user equipment, and schedule a retransmission of the transmission of a hybrid automatic repeat request from the hybrid automatic repeat request process based on the timer being active.

DETAILED DESCRIPTION

A wireless communications system may support a configured grant, which is an assignment of resources to a user equipment (UE) for data transmissions based on higher-layer signaling (e.g., radio resource control (RRC) layer signaling) without an associated grant over a physical downlink control channel. Hybrid automatic repeat request (HARQ) processes may be used to improve the reliability of transmissions communicated over configured grant resources. Techniques for restricting retransmission attempts of HARQ processes that use configured grant resources may be implemented. In addition, techniques for mitigating and managing scheduling conflicts between configured grants and dynamic grants may be implemented.

Techniques are described herein for improved methods, systems, devices, and apparatuses that support procedures for configured grants. Generally, the described techniques may relate to restricting a number of retransmissions used during a HARQ process or managing potential scheduling conflicts for the HARQ process from dynamic grants and configured grants. A device (e.g., a UE) may initiate a timer or a counter associated with a HARQ process for indicating that transmission attempts for a transport block of the HARQ process are permitted. The device may identify a transmission occasion of a configured grant in an unlicensed frequency spectrum band that is associated with the HARQ process and may determine that the timer associated with the HARQ process is active. The device may perform a transmission attempt over the transmission occasion of the configured grant based on determining that the timer is active.

Some techniques may relate to a device (e.g., a UE) determining that a counter associated with a HARQ process satisfies a threshold, and performing a transmission attempt for a transport block over a transmission occasion of a configured grant based on determining that the counter satisfies the threshold.

Some techniques may relate to a device (e.g., a base station) receiving a transmission over a transmission opportunity of a configured grant in an unlicensed frequency spectrum band that is associated with a HARQ process, identifying that the transmission is a last transmission of a transport block of the HARQ process received, initiating a timer based on identifying that the transmission is the last transmission for a transport block of the HARQ process received, and scheduling a retransmission of the transmission of a HARQ from the HARQ process based on the timer being active.

Aspects of the disclosure are initially described in the context of wireless communications systems. Aspects of the disclosure are described with reference to timing diagrams. Aspects of the disclosure are further illustrated by and described with reference to apparatus diagrams, system diagrams, and flowcharts that relate to procedures for configured grants.

Figure 1:
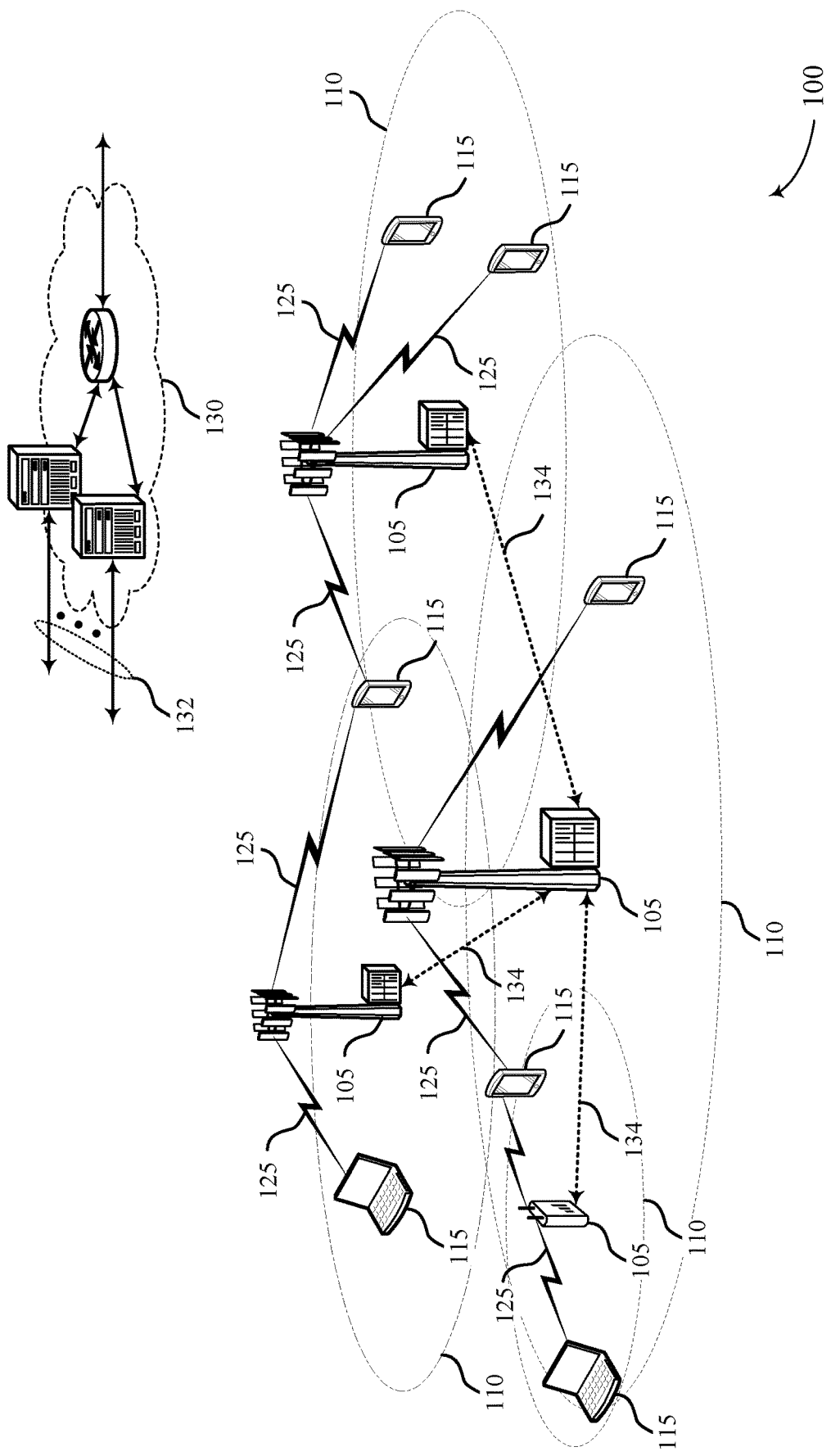
FIG. 1 illustrates an example of a system for wireless communications that supports procedures for configured grants in accordance with aspects of the present disclosure.

FIG. 1 illustrates an example of a wireless communications system 100 that supports procedures for configured grants in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Techniques are described herein for improved methods, systems, devices, and apparatuses, that may be associated with or performed by one or more components of communications system 100, that support procedures for configured grants. Generally, the described techniques may relate to a device (e.g., a UE 115 in communications system 100) initiating a timer associated with a HARQ process for indicating that transmission attempts for a transport block of the HARQ process are permitted, identifying a transmission occasion of a configured grant in an unlicensed frequency spectrum band that is associated with the HARQ process, determining that the timer associated with the HARQ process is active, and performing a transmission attempt of the transport block over the transmission occasion of the configured grant based on determining that the timer is active. In some cases, the transmission attempt may include a successful transmission or an unsuccessful transmission.

Some techniques may relate to a device (e.g., a UE 115 in communications system 100) determining that a counter associated with a HARQ process satisfies a threshold, and performing a transmission attempt of a transport block over a transmission occasion of a configured grant based on determining that the counter satisfies the threshold.

Some techniques may relate to a device (e.g., a base station 105 in communications system 100) receiving a transmission over a transmission opportunity of a configured grant in an unlicensed frequency spectrum band that is associated with a HARQ process, identifying that the transmission is a last transmission of a transport block of the HARQ process received, initiating a timer based on identifying that the transmission is the last transmission of the transport block of the HARQ process received, and scheduling a retransmission of the transmission of a HARQ from the HARQ process based on the timer being active.

Figure 2:
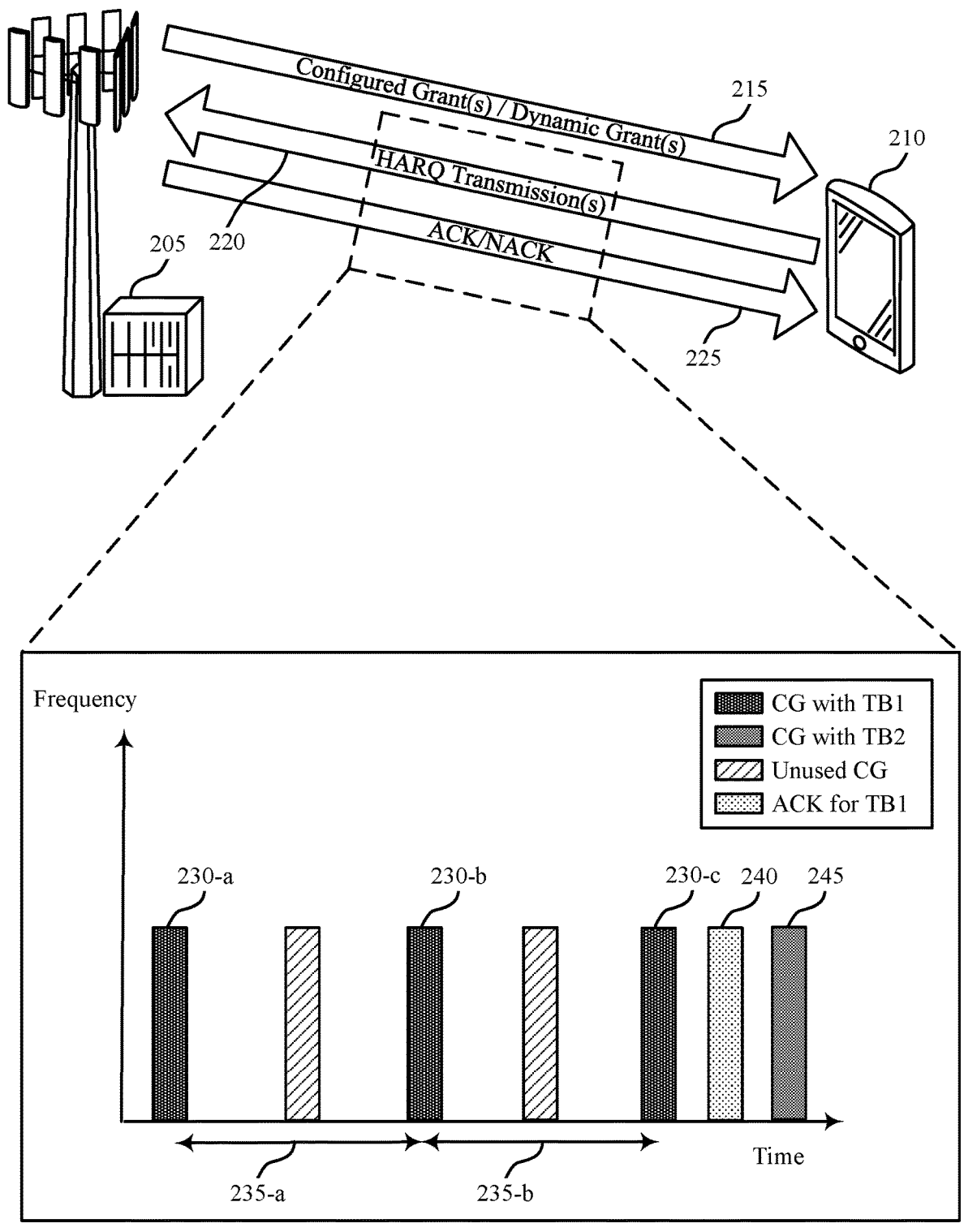
FIG. 2 illustrates an example of a wireless communications system that supports procedures for configured grants in accordance with aspects of the present disclosure.

FIG. 2 illustrates an example of a wireless communications system 200 that supports procedures for configured grants in accordance with aspects of the present disclosure. In some examples, the wireless communications system 200 may implement aspects of wireless communications system 100. The wireless communications system 200 may include a base station 205 and a UE 210. The base station 205 may be an example of a base station 105 described with reference to FIG. 1. The UE 210 may be an example of a UE 115 described with reference to FIG. 1.

The wireless communications system 200 may support both dynamic grants of uplink resources and configured grants of uplink resources. Dynamic grants may refer to allocations of uplink resources made by the base station 205 and then signaled to the UE 210 through messages sometimes referred to as dynamic grants. Configured grants may refer to allocations of uplink resources that are semi-persistently (or persistently) allocated to the UE 210. Configured grants may be shared by a plurality of UEs 210. Configured grants are configured to allow the UE 210 to transmit uplink messages without requesting a dynamic grant and then waiting for the base station 205 to allocate resources via a dynamic grant. Configured grants may be used to communicate low-latency information such as ultra-reliable, low-latency communications (URLLCs).

The base station 205 may communicate information about dynamic grants or configured grants through one or more grant messages 215. The dynamic grant messages may be individual messages that allocate specific resources. The configured grant messages may be examples of RRC signaling that indicate the periodicity of uplink transmission occasions, HARQ processes, or other parameters associated with the configured grant. Once the UE 210 receives a configured grant message, the UE 210 may configure the periodic resources of the configured grant. The UE 210 may perform one or more uplink transmissions 220 using the uplink resources identified as part of a dynamic grant or a configured grant. The base station 205 may communicate feedback 225, such as one or more acknowledgements (ACKs) or negative acknowledgements (NACK), in response to uplink transmissions 220.

Some wireless communications systems may support the use of configured grants in unlicensed frequency spectrum band. Configured grants in the unlicensed spectrum may provide a set of uplink resources to be used by the UE 210, which may occur periodically. Each configured grant may be associated with one or more HARQ processes. A UE 210 may be configured to support one or more configured grants at the same time in unlicensed frequency spectrum bands.

A UE 210 may be configured to perform a HARQ retransmission of a transport block when a retransmission timer 235 (e.g., cg-RetransmissionTimer) expires. For example, during a transmission occasion 230-$a$ of a first configured grant (CG) in an unlicensed spectrum band, the UE 210 may attempt to transmit a transport block (e.g., Transport Block 1 (TB1)). The transport block or the transmission occasion 230-$a$ may be associated with a specific HARQ process or a specific HARQ process ID. In unlicensed spectrum, the UE 210 may perform an LBT procedure (or something similar) before transmitting a transport block during the transmission occasion 230-$a$ on unlicensed spectrum. Thus, in the unlicensed spectrum a transmission attempt may include performing an LBT procedure and may not result in transmitting a transport block or a packet. Upon performing a transmission attempt or transmitting a transport block during the transmission occasion 230-$a$, the UE 210 may initiate or start a retransmission timer 235-$a$ (e.g., cg-RetransmissionTimer). The UE 210 may make a HARQ retransmission attempt of the transport block at the next available transmission occasion (e.g., transmission occasion 230-$b$) of the first configured grant that occurs after the retransmission timer 235-$a$ expires or is stopped and an ACK has not been received. The UE 210 may initiate or start a retransmission timer 235-$b$. At some point during the process, an ACK 240 may be received for the HARQ process, the HARQ process may be complete, the transport block may be released, and the HARQ process may be associated with a new transport block (e.g., TB2), as shown by transmission occasion 245 of the first configured grant.

The UE 210 may make a HARQ retransmission attempt of the transport block at the next available transmission occasion (e.g., transmission occasion 230-$c$) of the first configured grant that occurs after the retransmission timer 235-$b$ expires or is stopped and an ACK has not been received. At some point during the process, an ACK 240 may be received for the HARQ process, the HARQ process may be complete, the transport block may be released, and the HARQ process may be associated with a new transport block (e.g., TB2), as shown by transmission occasion 245 of the first configured grant.

A transmission attempt may refer to any attempt to transmit a transport block or packet, regardless of whether the transmission is successfully transmitted or not, successfully received or not, or combinations thereof. In some examples, a successful transmission may refer to a transmission that is transmitted by a transmitter (e.g., the UE 210). In some examples, a successful transmission may refer to a transmission that is transmitted by a transmitter (e.g., the UE 210) and received by the receiver (e.g., base station 205). In some examples, an unsuccessful transmission may refer to a transmission that does not reach its intended recipient for any reason. In some cases, a transmission may be unsuccessful because an LBT procedure failed or because a receiver failed to successfully decode the transmission for any reason.

Figure 3:
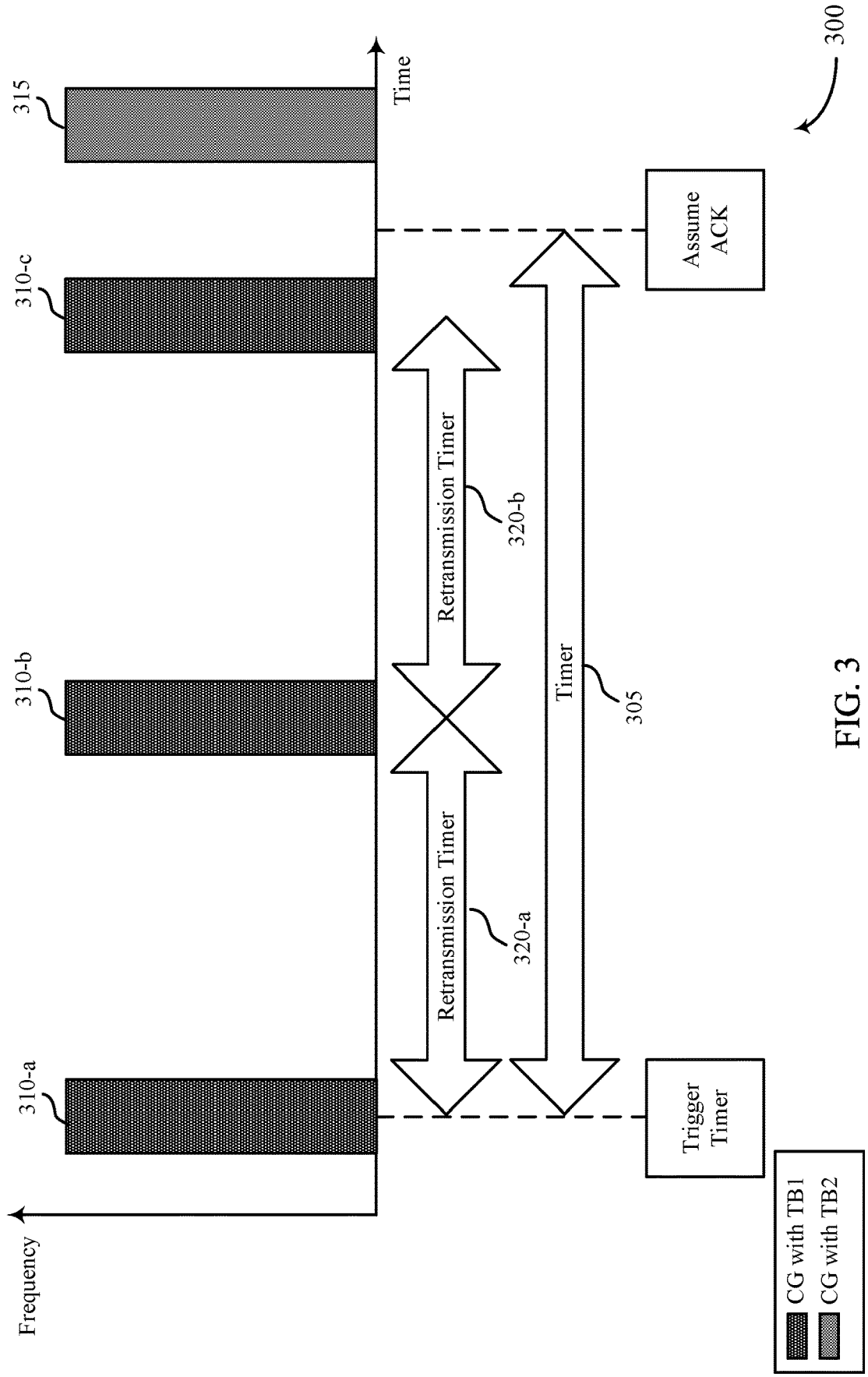
FIG. 3 illustrates an example of a timing diagram that supports procedures for configured grants in accordance with aspects of the present disclosure.

FIG. 3 illustrates an example of a timing diagram 300 that supports procedures for configured grants in accordance with aspects of the present disclosure. In some examples, the timing diagram 300 may implement aspects of wireless communications systems 100 and 200.

A number of HARQ retransmissions of a specific HARQ process for a given transport block may be restricted or limited using a timer or a counter. The timing diagram 300 illustrates how a timer 305 may be used to restrict the number of HARQ retransmissions.

A first configured grant may have a plurality of transmission occasions 310 and 315 that occur periodically. A transmission occasion may be communication resources (e.g., frequency resources, time resources, or a combination thereof) defined by the first configured grant to be used by a UE without the UE requesting access from a base station or other scheduling authority. Transmission occasions may be associated with a given HARQ process. For example, the transmission occasions 310-$a$, 310-$b$, and 310-$c$ may be associated with a first HARQ process. At the first transmission occasion 310-$a$, a UE may attempt to transmit a first transport block of the first HARQ process for the first time. The UE may proceed with using retransmission timers 320-$a$ or 320-$b$ or others to perform HARQ retransmission of the transport block using the subsequent transmission occasions 310-$b$ and 310-$c$ of the first configured grant that are associated with the first HARQ process.

The UE may be configured to perform HARQ retransmissions for the first transport block of the first HARQ process during a duration that the timer 305 is active, running, or a non-zero value. In some implementations, the UE may initiate or start the timer 305 based on the UE performing a first transmission attempt of a transport block using the HARQ process or HARQ process ID. In such implementations, the timer 305 may still be initiated or started even when an LBT procedure fails. In other implementations, the UE may initiate or start the timer 305 based on the first instance of UE successfully transmitting the transport block during a transmission occasion of the configured grant. In such implementations, the LBT procedure for the transmission occasion may be successful before the timer 305 is initiated.

The timer 305 may be set to a duration and may be initiated. The timer 305 may expire when the duration of the timer 305 has elapsed. In some implementations, the timer 305 is a countdown timer that starts at a value of the initial duration and counts down to a zero value. In such implementations, the timer 305 expires when the timer 305 reaches a zero value. Thus, the timer 305 may be considered active when the timer is at a non-zero value or when the timer 305 is running or counting down. In some implementations, the timer 305 may be an example of configured grant timer (e.g., configuredGrantTimer). The timer 305 may be different than retransmission timers 320.

The timer 305 may be configured with different durations based on different conditions. For example, a first duration may be used for the timer 305 when the timer 305 is initiated based on a transmission or a transmission attempt performed in response to a configured grant. A second duration may be used for the timer 305 when the timer 305 is initiated based on a transmission or transmission attempt performed in response to a dynamic grant. The first duration may be different than the second duration. In other examples, different durations may be used for different traffic service types transmitted during transmission occasions.

In some circumstances, dynamic grants and configured grants may attempt to use the same communication resources or the same HARQ process or the same HARQ process ID. In such circumstances, the UE may be configured to determine which grant (e.g., either the configured grant or the dynamic grant) will get to use the contested resources.

In some cases, the UE may determine a start criteria for the timer 305 and may base its determination of which grant will be implemented on the start criteria. In some implementations, the UE may determine whether the timer 305 was started due to a transmission or a transmission attempt performed in response to a dynamic grant. In such implementations, the UE may not be allowed to use the configured grant resources for the transmission attempt of the HARQ process associated with the dynamic grant when the timer is running. In some implementations, the UE may determine whether the timer 305 was started due to a transmission or a transmission attempt of a HARQ process performed in response to a configured grant. In such implementations, the UE may perform transmission/retransmissions of the HARQ process using the configured grant resources when the timer is running.

In some cases, the UE may determine a type of a previous transmission or a previous transmission attempt of the HARQ process and may base its determination of which grant will be implemented on the determined type. In some implementations, the UE may determine whether the previous transmission or previous transmission attempt of a HARQ process was performed in response to a dynamic grant. In such implementations, the UE may not be allowed to use the configured grant resources for the transmission or retransmission attempt of the HARQ process associated with the dynamic grant when the timer is running for the HARQ process. In some implementations, the UE may determine whether the previous transmission or a previous transmission attempt of a HARQ process was performed in response to a configured grant. In such implementations, the UE may perform transmission/retransmissions of the HARQ process using the configured grant resources when the timer is running for the HARQ process.

The UE may terminate (or restart, as the case may be) the HARQ process for the transport block based on a variety of different parameters. In a first example, the UE may terminate the HARQ process based on receiving an ACK from the base station for the HARQ process, as described with reference to FIG. 2. In a second example, the UE may restart or perform a retransmission of a HARQ process based on receiving a NACK or a dynamic grant from the base station requesting that the UE retransmit a transport block associated with the HARQ process. In some cases, the UE may terminate the timer when it receives a dynamic grant for the same HARQ process or if an ACK is received on downlink feedback information (DFI) for the same HARQ process.

The UE may terminate the HARQ process for the transport block based on the timer 305 expiring. In some implementations, after the UE determines that the timer 305 is expired, the UE may assume the transport block was received and may terminate the HARQ process. Said another way, the UE may assume an ACK was received for the HARQ process based on determining that the timer 305 is expired. When terminating a HARQ process for a given transport block, the UE may erase, clear, or flush the HARQ buffer associated with the HARQ process or may make the HARQ process or HARQ process ID available to be used by a different transport block. For example, the transmission occasion 315 of the first configured grant may be associated with a different transport block than the transport blocks associated with transmission occasions 310. In some cases, the transmission occasion 315 may also be associated with the same HARQ process as the transmission occasions 310. In some cases, the UE stops the timer 305 when it receives a dynamic grant for the same HARQ process or if an ACK is received on DFI for the same HARQ process.

In some cases, the UE may use a counter to restrict the number of HARQ retransmissions for a transport block of a HARQ process using a configured grant. The UE may maintain the counter to track a number of HARQ transmissions/retransmissions or attempts of the transport block using transmission occasions of the configured grant for the first HARQ process.

The UE may be configured to perform HARQ retransmissions for the first transport block of the first HARQ process until the counter satisfies a threshold (e.g., a duration that the counter is active or a non-zero value). The counter may be set to a value or quantity when initiated. The value may represent an upper limit of the number of HARQ transmissions/retransmissions that may be attempted or performed for a single transport block of a signal HARQ process. In some implementations, the counter may increment up to a threshold that represents the upper limit of the number of HARQ transmissions/retransmissions that may be attempted or performed for a single transport block of a signal HARQ process. In some implementations, the counter may count down. In such implementations, the counter may be set to the value that represents the upper limit of the number of HARQ transmissions/retransmissions that may be attempted or performed for a single transport block of a signal HARQ process. In such implementations, the threshold may be a zero value. The counter may expire when the counter satisfies threshold.

The UE may increment the counter based on a variety of different conditions. In some implementations, the UE may increment the counter when the UE performs a successful transmission associated with the transport block of the HARQ process. In some implementations, the UE may increment the counter when the UE performs any transmission attempt (regardless of whether the transmission attempt is successful) of the transport block.

The counter may include similar features as those of the timer 305. For example, the counter may be configured with different thresholds or different initial values based on different conditions described with reference to the timer 305. In other examples, the features of the timer 305 related to interactions with dynamic grants, the receiving of feedback, resetting the values, stoppages of the timer 305, expiry actions, or other features, or combinations thereof may be modified to apply to the counter. For instance, when the counter satisfies the threshold, the UE may assume an ACK is received and may terminate the HARQ process for that particular transport block.

Figure 4:
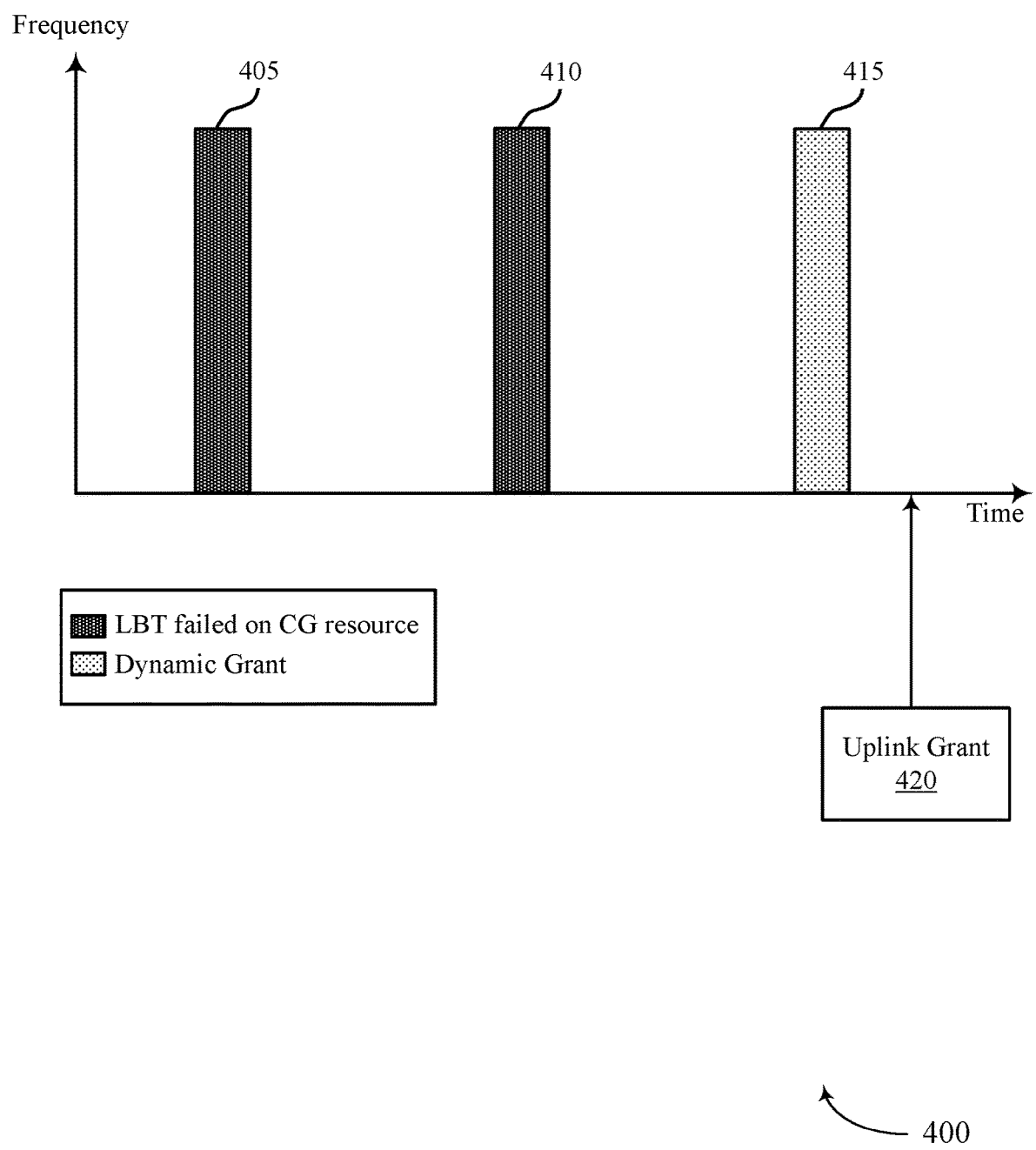
FIG. 4 illustrates an example of a timing diagram that supports procedures for configured grants in accordance with aspects of the present disclosure.

FIG. 4 illustrates an example of a timing diagram 400 that supports procedures for configured grants in accordance with aspects of the present disclosure. In some examples, the timing diagram 400 may implement aspects of wireless communications systems 100 and 200.

In an unlicensed frequency spectrum band, information about which transport block is associated with a specific HARQ process or HARQ process ID may become mismatched between a base station and a UE. For example, a base station may think that a first transport block is associated with a first HARQ process while a UE may think that a second transport block is associated with the first HARQ process. In such situations, the base station may transmit, and the UE may receive, a dynamic grant for a retransmission attempt of the first HARQ process that does not match (or contradicts) the information the UE has for the first HARQ process. The timing diagram 400 illustrates what circumstances can lead to such a mismatch and how one or more override procedures may be used to mitigate, prevent, or resolve such conflicts.

Transmission occasions 405, and 410 may be associated with a first configured grant while transmission occasion 415 may be associated with a dynamic grant. Transmission occasions 405 and 410 may be associated with a first transport block or a first HARQ process, while transmission occasion 415 may be associated with a second transport block different than the first transport block. In some cases, the transmission occasion 415 is associated with the first HARQ process.

Sometime between the transmission occasion 410 and the transmission occasion 415, the UE may terminate the HARQ process for the first transport block and may switch the HARQ process to the second transport block. In some cases, the base station may not be aware of such a switch. For example, if the transmission attempts associated with the transmission occasions 405 and 410 are unsuccessful (e.g., LBT failed or base station failed to receive), the base station may not be aware that the conditions for terminating the HARQ process for the first transport block have been met. The base station may transmit an uplink grant 420 to the UE that requests that the first transport block be retransmitted after the UE has switched the HARQ process. In such cases, the uplink grant 420 received by the UE conflicts with information of the HARQ process at the UE. The UE may use override procedures to address such a conflict.

In some examples, such conflicts between an uplink grant and information at a UE may occur when the base station schedules an uplink grant with a new data indicator toggled for the same HARQ process as is already running. In such examples, the UE may terminate the HARQ process from the previous transport block and perform a new transmission attempt for a new transport block using the HARQ process. In some examples, such conflicts between an uplink grant and information at a UE may conflict when an automatic new data indicator toggle is performed by the UE for the HARQ process (e.g., when the UE selects the HARQ process for a configured grant transmission). In such examples, the UE may terminate the HARQ process from the previous transport block and perform a new transmission attempt for a new transport block using the HARQ process. In some examples, such conflicts between an uplink grant and information at a UE may conflict when the base station schedules a retransmission grant of a transport block that is already erased from a HARQ buffer by the UE, but the base station is not aware of such an erasure.

In some cases, the base station may not be aware of the updated HARQ process at the UE because the UE failed to transmit one or more transport blocks to the UE in the unlicensed spectrum. For example, the LBT procedure failed. In other cases, the base station may not be aware of the updated HARQ process at the UE because the base station failed to successfully decode the messages. In such cases, the UE may have successfully transmitted the messages.

The UE may determine that an uplink grant conflicts with an existing HARQ process when the UE receives an uplink grant with a new data indicator toggled and one of the following criteria is met. First, in some implementations, the UE may determine that a conflict exists if a previous transmission attempt was on a configured grant resource for a transport block and the LBT procedure failed for each transmission attempt of the transport block. Second, in some implementations, the UE may determine that conflict exists if a retransmission timer (e.g., cg-RetransmissionTimer) is running and a timer (e.g., timer 305) is running due to a first transmission attempt of a new transport block on configured grant resources.

If the UE determines that a conflict exists between an uplink grant (e.g., a dynamic grant) and a HARQ process existing at the UE, the UE may perform one or more override procedures. In first example, the UE may ignore or skip the uplink grant associated with the HARQ process whose new data indicator is toggled. Meaning, the UE may refrain from performing a transmission attempt indicated in the uplink grant 420. In some cases, the UE may transmit uplink control information or a MAC control element indicating that the uplink grant 420 is ignored or skipped because the HARQ process is being used in a configured grant resource. In a second example, the UE may refrain from toggling a new data indicator for the HARQ process. In some cases, the UE may not allow the new data indicator for the HARQ process to be toggled autonomously by the UE. In a third example, the UE may perform a transmission attempt of the transport block stored in the HARQ buffer of the HARQ process indicated by the uplink grant. In such examples, such actions may result in the UE attempting to transmit a second transport block when the base station may be expecting a first transport block. In a fourth example, the UE may identify a second HARQ process or second HARQ process ID with which to attempt to transmit the transport block stored in the UE's HARQ buffer. The UE may perform a transmission attempt of that transport block using the second HARQ process. In effect, the UE may assign a new HARQ process ID to the transport block stored in HARQ buffer for the previous HARQ process ID based on receiving the uplink grant that is in conflict.

The UE may be configured to identify whether an uplink grant 420 received from the base station is not associated with a previous transmission attempt (e.g., a transmission attempt associated with transmission occasion 415) performed on a configured grant resource for a HARQ process. In some implementations, the UE may identify that the transport block stored in the HARQ buffer (e.g., the second transport block associated with the HARQ process by the user equipment) is different than the transport block indicated in the uplink grant 420 for the same HARQ process. In some implementations, the UE may identify that a size of the transport block stored in the HARQ buffer (e.g., the second transport block associated with the HARQ process by the user equipment) is different than a size of the transport block indicated in the uplink grant 420 for the same HARQ process. In some implementations, the UE may identify that the uplink grant 420 indicates the previous transmission for a HARQ process was performed for a dynamic grant. If the UE identifies that its most-recent transmission attempt of the HARQ process was in a configured grant resource, the UE may determine that there is a conflict between the uplink grant 420 and what is stored in the UE's HARQ buffer. In some implementations, the UE may identify that a first modulation and coding scheme indicated by the uplink grant for the HARQ process is different than a second modulation and coding scheme associated with a retransmission of transport block stored in the HARQ process (e.g., the transport block stored in the HARQ buffer for the HARQ process). Some configured grant retransmission may be performed using a special modulation and coding scheme. The UE may use this to identify when conflicts with the uplink grant 420 arise.

If the UE identifies that the uplink grant 420 received from the base station is not associated with a previous transmission performed on a configured grant resource, the UE may ignore or skip the uplink grant 420. If the UE identifies that the uplink grant 420 received from the base station is not associated with a previous transmission performed on a configured grant resource, the UE may discard the uplink grant 420 and not perform any transmission attempts indicated in the uplink grant 420. In some cases, the UE may transmit uplink control information or a MAC control element indicating that the uplink grant 420 is ignored or skipped because of transport block mismatch of the HARQ process.

Figure 5:
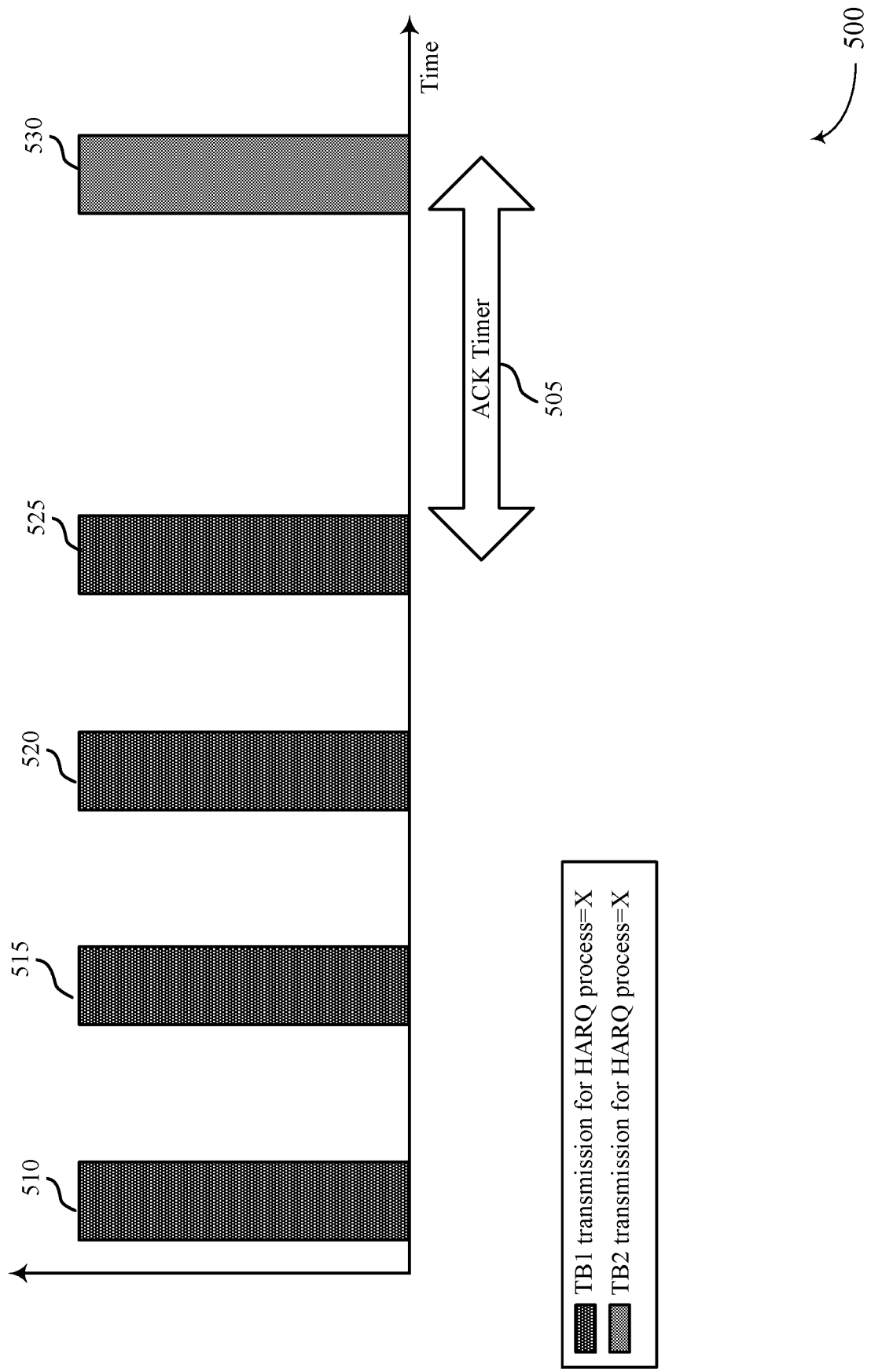
FIG. 5 illustrates an example of a timing diagram that supports procedures for configured grants in accordance with aspects of the present disclosure.

FIG. 5 illustrates an example of a timing diagram 500 that supports procedures for configured grants in accordance with aspects of the present disclosure. In some examples, the timing diagram 500 may implement aspects of wireless communications systems 100 and 200.

A wireless communications system may want to avoid a situation where a base station provides an uplink grant for a transport block that has already been erased from a HARQ buffer by the UE. The timing diagram 500 illustrates how a timer 505 may be used to prevent such circumstances.

The timer 505 may be configured to allow a base station to schedule a retransmission of a first transport block associated with the HARQ process without overriding a second transport block associated with the HARQ by a user equipment. In effect, the timer 505 may be used to delay when the UE clears the HARQ buffer and reassigns the HARQ process ID to a new transport block. A duration of the timer 505 may be configured to allow the base station to schedule retransmission of a transport block without overriding a new transport block transmission.

The timer 505 may have a duration that acts as a margin time after the last transmission of the first transport block. The timer 505 may be initiated or started based on the UE determining that a transmission attempt or a successful transmission of a first transport block of the HARQ process is the last transmission attempt or transmission before the HARQ process is terminated for that first transport block. In some cases, UE may initiate timer 505 for a HARQ process when timer 305 expires for the same HARQ process. The UE may be configured to wait to terminate the HARQ process for the first transport block until after the timer 505 is expired. In some cases, the UE may refrain from using resources of the configured grant until the timer 505 expires. The timer 505 may be different than the timer 305 or a retransmission timer (e.g., cg-RetransmissionTimer). In some cases, however, the timer 505 may be a retransmission timer (e.g., cg-RetransmissionTimer) initiated after the last transmission attempt of the HARQ process. In some cases, the UE may initiate the timer 505 after the last transmission attempt of the HARQ process for a configured grant.

The timing diagram 500 shows transmission occasions 510, 515, 520, and 525 being used to attempt to transmit a first transport block. The UE may determine that the transmission occasion 525 is the last attempt to transmit the first transport block as part of the HARQ process. The UE may initiate or start the timer 505 based on this determination. After the timer 505 expires, the UE may associate the HARQ process with a new transport block. The transmission occasion 530 illustrates that the HARQ process may be associated with the new transport block.

In some implementations, the timer 505 may be a retransmission timer initiated after the last transmission attempt of the HARQ process. The UE may not use a configured grant resource for the HARQ process until the timer 505 expires. When the timer 505 expires, if a number of retransmission attempts are not exhausted (e.g., if timer 305 is running for the HARQ process), the UE may assume a NACK was received and proceed accordingly, else the UE may assume an ACK was received and proceed accordingly.

The timer 505 may include similar features as the timer 305 described with reference to FIG. 3. For example, the timer 505 may be configured with different durations based on different conditions described with reference to the timer 305. In other examples, the features of the timer 305 related to interactions with dynamic grants, the receiving of feedback, resetting the values, stoppages of the timer 305, expiry actions, or other features, or combinations thereof may be modified to apply to the timer 505.

The base station may also maintain a timer 505 that is triggered based on the base station receiving a transport block for a HARQ process. The base station may identify that the received transport block is the last received (e.g., most recently received) transport block associated with the HARQ process. The base station may initiate the timer 505 based on this determination. The duration of the timer 505 for the base station may be similar to the duration of the timer 505 for the UE. The base station may schedule a retransmission of the transport block based on the timer 505 being active. If the base station identifies that the timer 505 is expired, the base station may terminate the HARQ process.

Figure 6:
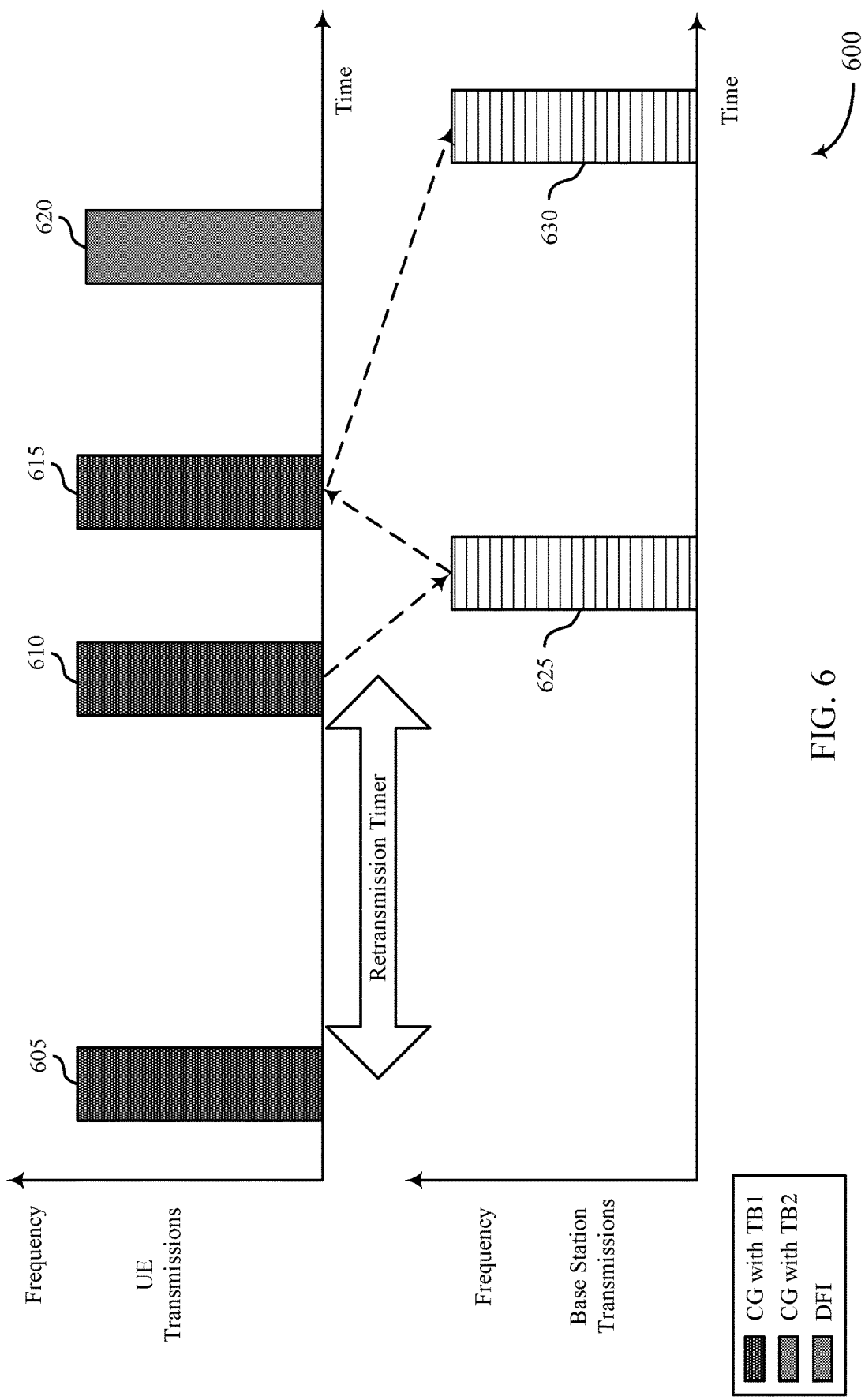
FIG. 6 illustrates an example of a timing diagram that supports procedures for configured grants in accordance with aspects of the present disclosure.

FIG. 6 illustrates an example of a timing diagram 600 that supports procedures for configured grants in accordance with aspects of the present disclosure. In some examples, the timing diagram 600 may implement aspects of wireless communications systems 100 and 200.

In some cases, a base station may send feedback (e.g., in a DFI) that corresponds to an old transport block that the UE has already erased from its HARQ buffer. The timing diagram 600 illustrates situations and solutions for such scenarios.

One issue with such situations, is that when the UE receives feedback (e.g., ACK or NACK) from a base station for an old transport block, the UE may take actions using the new transport block. For example, the UE may retransmit the new transport block that the base station has not yet received. The base station may then send additional feedback (e.g., ACKs or NACKs) based on this new transport block. It is unlikely that the new transport block transmitted by the UE will match the old transport block expected by the base station in such a situation. There a variety of ways to address such situations.

In some implementations, the UE may determine whether a new data indicator value in the feedback matches a new data indicator associated with the transport block stored in the UE's HARQ buffer for the HARQ process (e.g., the transport block used for the previous transmission attempt by the UE). If the new data indicators match, the UE may take normal action based on what type of feedback was received. For example, if an ACK is received, the UE may terminate the HARQ process for the transport block. If a NACK is received, the UE may perform another transmission attempt of the transport block. If the new data indicators do not match, the UE may ignore feedback received from the base station. In some cases, the UE may treat the feedback as a NACK if the new data indicators do not match. In some cases, the feedback may include HARQ feedback for both configured grant HARQ process IDs and regular HARQ process IDs. A new data indicator bit may be included in the feedback for the configured grant HARQ process IDs.

In some implementations, the UE may identify that a previous transmission attempt associated with the HARQ process is for the configured grant and may determine that an LBT procedure associated with the previous transmission attempt failed. The UE may ignore the feedback based at least in part on this identification. In some cases, the UE may ignore the feedback for a HARQ process if the previous transmission attempt was on a configured grant resource for a transport block for which the LBT procedure failed for each of the transmission attempts of the transport block.

The timing diagram 600 illustrates an example of such scenarios. The transmission occasions 605, 610, and 615 may be used for a first transport block of the HARQ process. For these transmission occasions 605, 610, and 615, the new data indicator bit may be set to zero or may indicate that there is no new data. The transmission occasion 620 may be used for a second transport block of the HARQ process. For the transmission occasion 620, the new data indicator bit may be set to one or may indicate there is new data. The base station may transmit feedback 625 indicating a NACK, which may cause the UE to perform a transmission attempt at transmission occasion 615. If the base station transmits feedback 630 for the first transport block after the UE has switched to the second transport block, the UE may ignore the feedback 630. The feedback 630 may include a new indicator bit set to zero because it is associated with the first transport block. The UE may be able to determine the mismatch of the new data indicators associated with the transmission occasion 620 and the feedback 630 that comes after the transmission occasion 620 and act accordingly.

Figure 7:
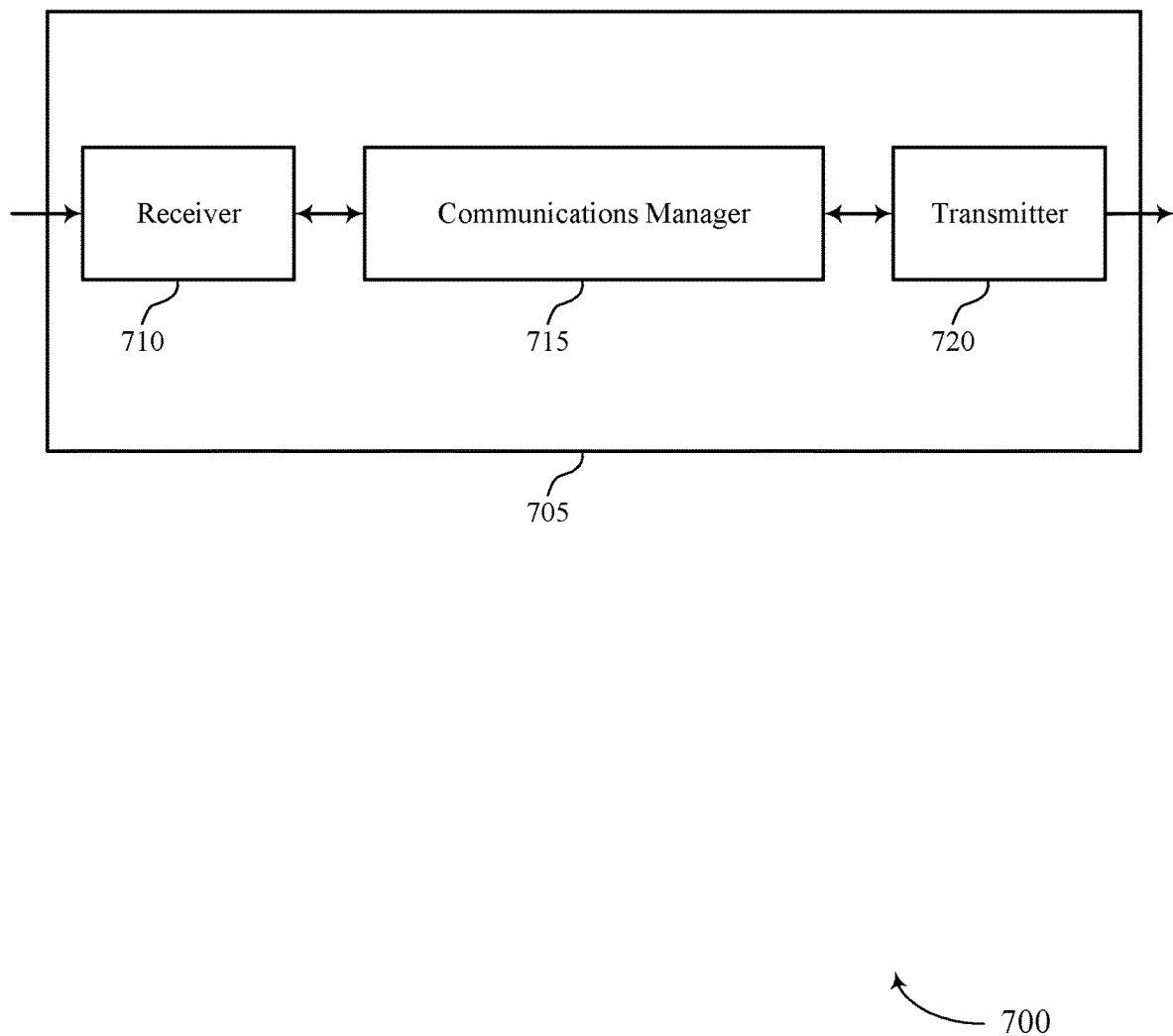
FIGS. 7 and 8 show block diagrams of devices that support procedures for configured grants in accordance with aspects of the present disclosure.

FIG. 7 shows a block diagram 700 of a device 705 that supports procedures for configured grants in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to procedures for configured grants). Information may be passed on to other components of the device 705. The receiver 710 may be an example of aspects of the transceiver 1020 described with reference to FIG. 10. The receiver 710 may utilize a single antenna or a set of antennas.

The communications manager 715 may initiate a timer associated with a hybrid automatic repeat request process for indicating that transmission attempts for a transport block of the hybrid automatic repeat request process are permitted, identify a transmission occasion of a configured grant in an unlicensed frequency spectrum band that is associated with the hybrid automatic repeat request process, determine that the timer associated with the hybrid automatic repeat request process is active, and perform a transmission attempt for the transport block over the transmission occasion of the configured grant based on determining that the timer is active, where the transmission attempt includes a successful transmission or an unsuccessful transmission. The communications manager 715 may also initiate a counter associated with a hybrid automatic repeat request process for indicating that transmission attempts for a transport block of the hybrid automatic repeat request process are permitted, determine that the counter associated with the hybrid automatic repeat request process satisfies a threshold, identify a transmission occasion of a configured grant in an unlicensed frequency spectrum band that is associated with the hybrid automatic repeat request process, and perform a transmission attempt of the transport block over the transmission occasion of the configured grant based on determining that the counter satisfies the threshold, where the transmission attempt includes a successful transmission or an unsuccessful transmission. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
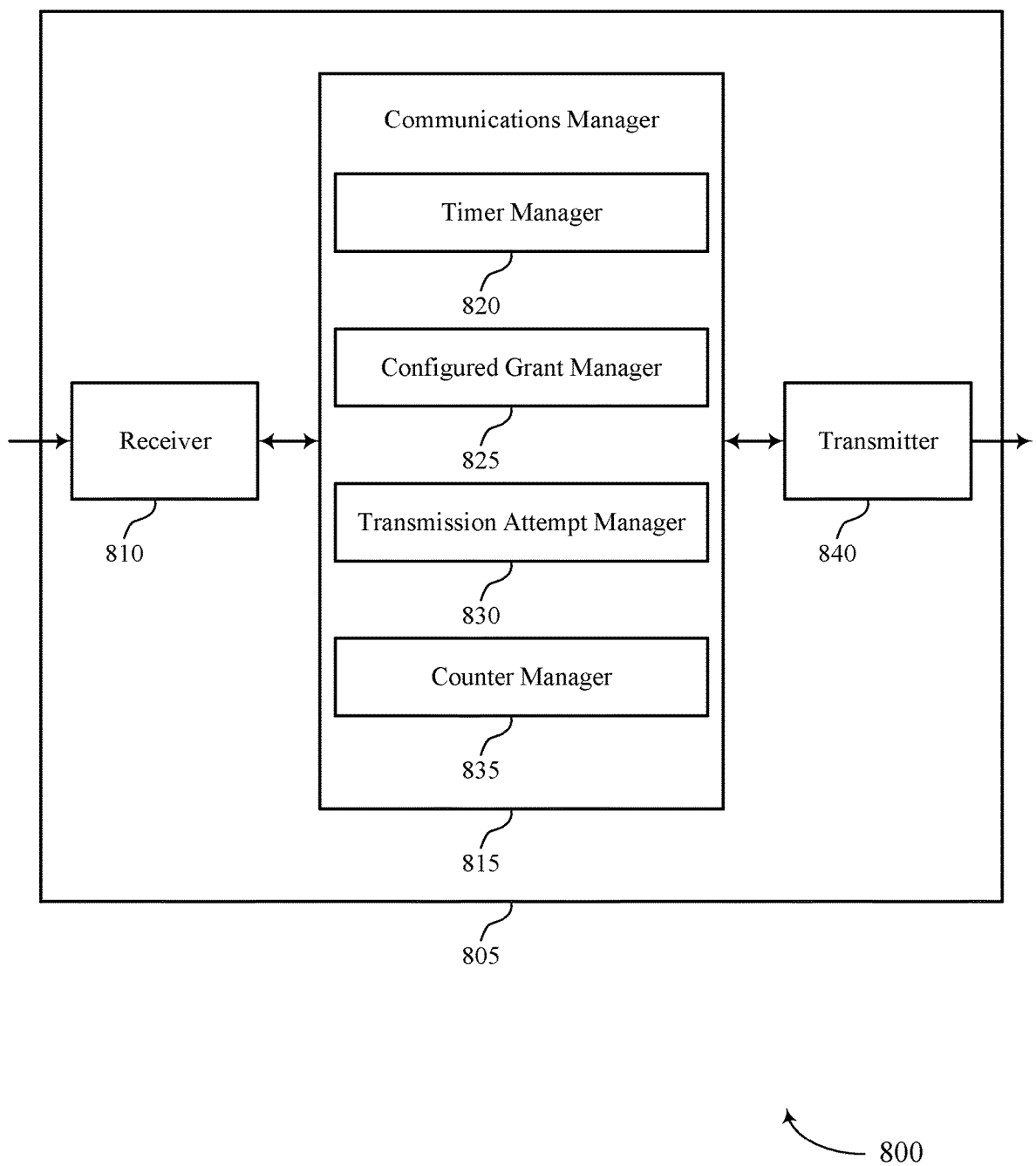

FIG. 8 shows a block diagram 800 of a device 805 that supports procedures for configured grants in accordance with aspects of the present disclosure. The device 805 may be an example of aspects of a device 705, or a UE 115 as described herein. The device 805 may include a receiver 810, a communications manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to procedures for configured grants). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a timer manager 820, a configured grant manager 825, a transmission attempt manager 830, and a counter manager 835. The communications manager 815 may be an example of aspects of the communications manager 1010 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The timer manager 820 may initiate a timer associated with a hybrid automatic repeat request process for indicating that transmission attempts for a transport block of the hybrid automatic repeat request process are permitted.

The configured grant manager 825 may identify a transmission occasion of a configured grant in an unlicensed frequency spectrum band that is associated with the hybrid automatic repeat request process and determine that the timer associated with the hybrid automatic repeat request process is active.

The transmission attempt manager 830 may perform a transmission attempt of the transport block over the transmission occasion of the configured grant based on determining that the timer is active, where the transmission attempt includes a successful transmission or an unsuccessful transmission. The transmission attempt manager 830 may perform a transmission attempt of the transport block over the transmission occasion of the configured grant based on determining that the counter satisfies the threshold, where the transmission attempt includes a successful transmission or an unsuccessful transmission.

The counter manager 835 may initiate a counter associated with a hybrid automatic repeat request process for indicating that transmission attempts for a transport block of the hybrid automatic repeat request process are permitted and determine that the counter associated with the hybrid automatic repeat request process satisfies a threshold.

The transmitter 840 may transmit signals generated by other components of the device 805. In some examples, the transmitter 840 may be collocated with a receiver 810 in a transceiver module. For example, the transmitter 840 may be an example of aspects of the transceiver 1020 described with reference to FIG. 10. The transmitter 840 may utilize a single antenna or a set of antennas.

Figure 9:
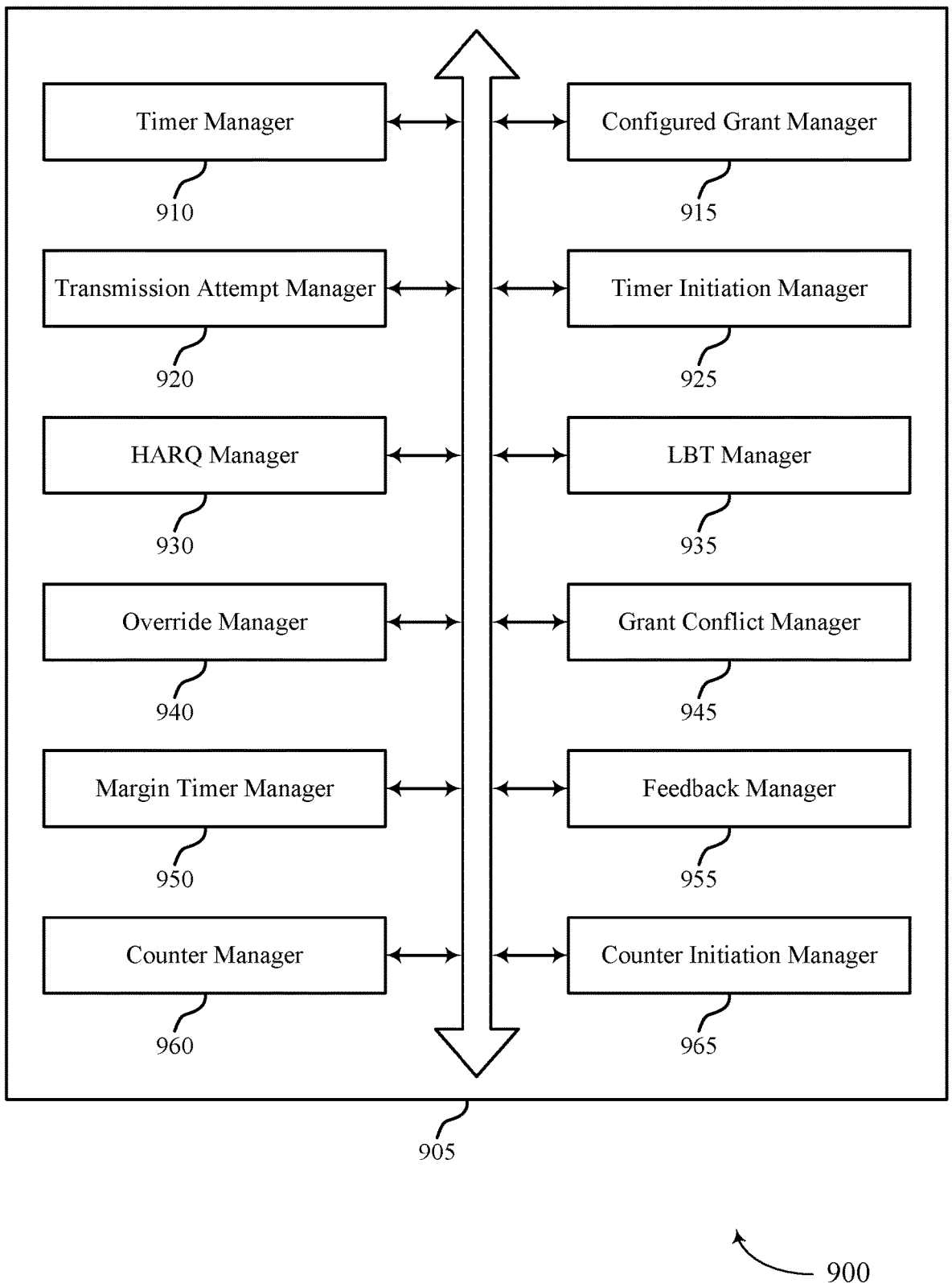
FIG. 9 shows a block diagram of a communications manager that supports procedures for configured grants in accordance with aspects of the present disclosure.

FIG. 9 shows a block diagram 900 of a communications manager 905 that supports procedures for configured grants in accordance with aspects of the present disclosure. The communications manager 905 may be an example of aspects of a communications manager 715, a communications manager 815, or a communications manager 1010 described herein. The communications manager 905 may include a timer manager 910, a configured grant manager 915, a transmission attempt manager 920, a timer initiation manager 925, a HARQ manager 930, an LBT manager 935, an override manager 940, a grant conflict manager 945, a margin timer manager 950, a feedback manager 955, a counter manager 960, and a counter initiation manager 965. Each of these modules may communicate, directly or indirectly, with one another (e.g., via one or more buses).

The communications manager 905, or its sub-components, may be implemented in hardware, code (e.g., software or firmware) executed by a processor, or any combination thereof. If implemented in code executed by a processor, the functions of the communications manager 905, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 905, or its sub-components, may be physically located at various positions, including being distributed such that portions of functions are implemented at different physical locations by one or more physical components. In some examples, the communications manager 905, or its sub-components, may be a separate and distinct component in accordance with various aspects of the present disclosure. In some examples, the communications manager 905, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The timer manager 910 may initiate a timer associated with a hybrid automatic repeat request process for indicating that transmission attempts for a transport block of the hybrid automatic repeat request process are permitted. In some examples, the timer manager 910 may determine that initiating the timer is based on a second transmission attempt performed in response to the configured grant, where performing the transmission attempt is based on determining that initiating the timer is in response to the configured grant. In some cases, performing the transmission attempt is based on the timer being initiated in response to the configured grant.

In some examples, the timer manager 910 may identify a duration of the timer based on the transmission occasion being for the configured grant, where initiating the timer is based on identifying the duration. In some examples, the timer manager 910 may receive a dynamic grant associated with the hybrid automatic repeat request process or an acknowledgment associated with the hybrid automatic repeat request process. In some examples, the timer manager 910 may reset the timer associated with the hybrid automatic repeat request process based on receiving the dynamic grant or the acknowledgment.

In some examples, the timer manager 910 may determine that a retransmission timer associated with the hybrid automatic repeat request process is expired, the retransmission timer for indicating a duration between transmission attempts of the hybrid automatic repeat request process, where identifying the transmission occasion is based on determining that the retransmission timer is expired. In some cases, a second duration of the timer associated with the transmission occasion being for a dynamic grant is different than the duration associated with the transmission occasion being for the configured grant. In some cases, the timer includes a configured grant timer (e.g., configuredGrant-Timer).

The configured grant manager 915 may identify a transmission occasion of a configured grant in an unlicensed frequency spectrum band that is associated with the hybrid automatic repeat request process. In some examples, the configured grant manager 915 may determine that the timer associated with the hybrid automatic repeat request process is active. In some examples, the configured grant manager 915 may identify a transmission occasion of a configured grant in an unlicensed frequency spectrum band that is associated with the hybrid automatic repeat request process. In some examples, the configured grant manager 915 may determine that a previous transmission attempt associated with the hybrid automatic repeat request process was performed in response to the configured grant, where performing the transmission attempt is based on determining that the previous transmission attempt was in response to the configured grant. In some cases, performing the transmission attempt is based on the previous transmission attempt being in response to the configured grant.

The transmission attempt manager 920 may perform a transmission attempt of a transport block over the transmission occasion of the configured grant based on determining that the timer is active, where the transmission attempt includes a successful transmission or an unsuccessful transmission. In some examples, performing a transmission attempt of a transport block over the transmission occasion of the configured grant based on determining that the counter satisfies the threshold, where the transmission attempt includes a successful transmission or an unsuccessful transmission. In some examples, generating a transport block for the transmission occasion, where performing the transmission attempt includes attempt to transmit the transport block over resources associated with the transmission occasion.

In some examples, the transmission attempt manager 920 may determine that whether a previous transmission attempt associated with the hybrid automatic repeat request process is in response to the configured grant or a dynamic grant, where performing the transmission attempt is based on determining that the previous transmission attempt was in response to the configured grant. In some examples, generating a transport block for the transmission occasion, where performing the transmission attempt includes attempt to transmit the transport block over resources associated with the transmission occasion.

In some examples, the transmission attempt manager 920 may determine that whether a previous transmission attempt associated with the hybrid automatic repeat request process is in response to the configured grant or a dynamic grant, where performing the transmission attempt is based on determining that the previous transmission attempt was in response to the configured grant.

The timer initiation manager 925 may perform a second transmission attempt associated with the hybrid automatic repeat request process over a second transmission occasion, the second transmission occasion occurs before the transmission occasion, where initiating the timer is based on performing the second transmission attempt. In some examples, the timer initiation manager 925 may transmit, successfully, a transport block associated with the hybrid automatic repeat request process over a second transmission occasion, the second transmission occasion occurring before the transmission occasion, where initiating the timer is based on successfully transmitting the transport block.

In some examples, the timer initiation manager 925 may determine whether initiating the timer is based on a second transmission attempt performed in response to the configured grant or a dynamic grant, where performing the transmission attempt is based on determining that initiating the timer is in response to the configured grant. In some cases, the second transmission attempt includes a first instance that a transport block of the HARQ process is attempted to be transmitted. In some cases, the transmission of the transport block includes a first instance that the transport block of the HARQ process is successfully transmitted.

The HARQ manager 930 may identify that the timer is expired. In some examples, the HARQ manager 930 may terminate the hybrid automatic repeat request process based on identifying that the timer is expired. In some examples, the HARQ manager 930 may identify that the counter exceeds the threshold. In some examples, the HARQ manager 930 may terminate the hybrid automatic repeat request process based on identifying that the counter exceeding the threshold. In some examples, the HARQ manager 930 may receive a dynamic grant associated with the hybrid automatic repeat request process or an acknowledgment associated with the hybrid automatic repeat request process. In some examples, the HARQ manager 930 may reset the counter associated with the hybrid automatic repeat request process based on receiving the dynamic grant or the acknowledgment.

The LBT manager 935 may perform an LBT procedure on resources associated with the transmission occasion, where performing the transmission attempt is based on performing the LBT procedure. In some examples, the LBT manager 935 may perform an LBT procedure on resources associated with the transmission occasion, where performing the transmission attempt is based on performing the LBT procedure.

The override manager 940 may receive, from a base station, an uplink grant requesting that a first transport block associated with the hybrid automatic repeat request process be transmitted, the uplink grant including a new data indicator. In some examples, the override manager 940 may identify, by a user equipment, that a second transport block different than the first transport block is associated with the hybrid automatic repeat request process based on receiving the uplink grant. In some examples, the override manager 940 may perform an override procedure based on identifying that the second transport block is different than the first transport block.

In some examples, the override manager 940 may determine that a previous transmission attempt of the second transport block is associated with the configured grant and that LBT procedure failed for each of the previous transmission attempts of the second transport block, where performing the override procedure is based on the determination. In some examples, the override manager 940 may determine that a retransmission timer associated with the hybrid automatic repeat request process is active, where performing the override procedure is based on the determination. In some examples, the override manager 940 may ignore the uplink grant. In some examples, the override manager 940 may transmit an indication that the uplink grant is ignored.

In some examples, the override manager 940 may refrain from toggling the new data indicator for the hybrid automatic repeat request process. In some examples, the override manager 940 may perform a second transmission attempt of the second transport block using the uplink grant. In some examples, the override manager 940 may identify a second hybrid automatic repeat request process with which to attempt to transmit the second transport block. In some examples, the override manager 940 may perform a transmission attempt of the second transport block using the second hybrid automatic repeat request process.

In some examples, the override manager 940 may receive, from a base station, an uplink grant requesting that a first transport block associated with the hybrid automatic repeat request process be transmitted, the uplink grant including a new data indicator. In some examples, the override manager 940 may identify, by a user equipment, that a second transport block different than the first transport block is associated with the hybrid automatic repeat request process based on receiving the uplink grant. In some examples, the override manager 940 may perform an override procedure based on identifying that the second transport block is different than the first transport block.

In some examples, the override manager 940 may determine that a previous transmission attempt of the second transport block is associated with the configured grant and that LBT procedure failed for each of the previous transmission attempts of the second transport block, where performing the override procedure is based on the determination. In some examples, the override manager 940 may determine that a retransmission timer associated with the hybrid automatic repeat request process is active, where performing the override procedure is based on the determination. In some examples, the override manager 940 may ignore the uplink grant. In some examples, the override manager 940 may transmit an indication that the uplink grant is ignored.

In some examples, the override manager 940 may refrain from toggling the new data indicator for the hybrid automatic repeat request process. In some examples, the override manager 940 may perform a second transmission attempt of the second transport block using the uplink grant. In some examples, the override manager 940 may identify a second hybrid automatic repeat request process with which to attempt to transmit the second transport block. In some examples, the override manager 940 may perform a transmission attempt of the second transport block using the second hybrid automatic repeat request process.

The grant conflict manager 945 may receive, from a base station, an uplink grant requesting that a first transport block associated with the hybrid automatic repeat request process be retransmitted. In some examples, the grant conflict manager 945 may determine, by a user equipment, that the uplink grant is not associated with a second transport block used during a previous transmission attempt associated with the hybrid automatic repeat request process.

In some examples, the grant conflict manager 945 may identify, by the user equipment, that the second transport block associated with the hybrid automatic repeat request process by the user equipment is different than the first transport block indicated in the uplink grant. In some examples, the grant conflict manager 945 may identify, by the user equipment, that a first size of the second transport block associated with the hybrid automatic repeat request process by the user equipment is different than a second size of the first transport block indicated in the uplink grant. In some examples, the grant conflict manager 945 may identify that a dynamic grant indicated by the uplink grant as being associated with the previous transmission attempt of the hybrid automatic repeat request process is different than the configured grant associated with the previous transmission attempt of the hybrid automatic repeat request process by the user equipment.

In some examples, the grant conflict manager 945 may identify that a first modulation and coding scheme indicated by the uplink grant is different than a second modulation and coding scheme associated with the previous transmission attempt of the hybrid automatic repeat request process. In some examples, the grant conflict manager 945 may discard the uplink grant based on determining that the uplink grant is not associated with the second transport block used during the previous transmission attempt associated with the hybrid automatic repeat request process. In some examples, the grant conflict manager 945 may receive, from a base station, an uplink grant requesting that a first transport block associated with the hybrid automatic repeat request process be retransmitted.

In some examples, the grant conflict manager 945 may determine, by a user equipment, that the uplink grant is not associated with a second transport block used during a previous transmission attempt associated with the hybrid automatic repeat request process. In some examples, the grant conflict manager 945 may identify, by the user equipment, that the second transport block associated with the hybrid automatic repeat request process by the user equipment is different than the first transport block indicated in the uplink grant. In some examples, the grant conflict manager 945 may identify, by the user equipment, that a first size of the second transport block associated with the hybrid automatic repeat request process by the user equipment is different than a second size of the first transport block indicated in the uplink grant.

In some examples, the grant conflict manager 945 may identify that a dynamic grant indicated by the uplink grant as being associated with the previous transmission attempt of the hybrid automatic repeat request process is different than the configured grant associated with the previous transmission attempt of the hybrid automatic repeat request process by the user equipment. In some examples, the grant conflict manager 945 may identify that a first modulation and coding scheme indicated by the uplink grant is different than a second modulation and coding scheme associated with the previous transmission attempt of the hybrid automatic repeat request process. In some examples, the grant conflict manager 945 may discard the uplink grant based on determining that the uplink grant is not associated with the second transport block used during the previous transmission attempt associated with the hybrid automatic repeat request process.

The margin timer manager 950 may identify that the transmission attempt is a last transmission attempt of a transport block of the hybrid automatic repeat request process. In some examples, the margin timer manager 950 may initiate a second timer based on identifying that the transmission attempt is the last transmission attempt of a transport block. In some examples, the margin timer manager 950 may terminate the hybrid automatic repeat request process after the second timer expires. In some examples, the margin timer manager 950 may identify that the transmission attempt is a last transmission attempt of the transport block of the hybrid automatic repeat request process.

In some examples, the margin timer manager 950 may initiate a timer based on identifying that the transmission attempt is the last transmission attempt of the transport block. In some examples, the margin timer manager 950 may terminate the hybrid automatic repeat request process after the timer expires. In some cases, the second timer includes a retransmission timer. In some cases, a duration of the second timer is for allowing a base station to schedule a retransmission of a first transport block associated with the hybrid automatic repeat request process without overriding a second transport block associated with the hybrid automatic repeat request process by a user equipment. In some cases, the timer includes a retransmission timer. In some cases, a duration of the timer is for allowing a base station to schedule a retransmission of a first transport block associated with the hybrid automatic repeat request process without overriding a second transport block associated with the hybrid automatic repeat request process by a user equipment.

The feedback manager 955 may receive, from a base station, feedback about the hybrid automatic repeat request process. In some examples, the feedback manager 955 may identify a first new data indicator of a previous transmission attempt associated with the hybrid automatic repeat request process. In some examples, the feedback manager 955 may determine whether the first new data indicator matches a second new data indicator included in the feedback from the base station. In some examples, the feedback manager 955 may perform an action indicated by the feedback based on determining that the first new data indicator matches the second new data indicator. In some examples, the feedback manager 955 may configure the hybrid automatic repeat request process with a second transport block based on the feedback including an acknowledgment.

In some examples, the feedback manager 955 may retransmit a transport block based on the feedback including a negative acknowledgment. In some examples, the feedback manager 955 may ignore the feedback based on determining that the first new data indicator does not match the second new data indicator. In some examples, the feedback manager 955 may receive, from a base station, feedback about the hybrid automatic repeat request process.

In some examples, the feedback manager 955 may identify that a previous transmission attempt associated with the hybrid automatic repeat request process is for the configured grant and an LBT procedure associated with the previous transmission attempt failed. In some examples, the feedback manager 955 may ignore the feedback based on identifying that the previous transmission attempt associated with the hybrid automatic repeat request process is for the configured grant and the LBT procedure failed for each of the transmission attempts of the transport block.

In some examples, the feedback manager 955 may receive, from a base station, feedback about the hybrid automatic repeat request process. In some examples, the feedback manager 955 may identify a first new data indicator of a previous transmission attempt associated with the hybrid automatic repeat request process. In some examples, the feedback manager 955 may determine whether the first new data indicator matches a second new data indicator included in the feedback from the base station. In some examples, the feedback manager 955 may perform an action indicated by the feedback based on determining that the first new data indicator matches the second new data indicator.

In some examples, the feedback manager 955 may ignore the feedback based on determining that the first new data indicator does not match the second new data indicator. In some examples, the feedback manager 955 may receive, from a base station, feedback about the hybrid automatic repeat request process. In some examples, the feedback manager 955 may identify that a previous transmission attempt associated with a transport block of the hybrid automatic repeat request process is for the configured grant and an LBT procedure associated with the previous transmission attempt failed. In some examples, the feedback manager 955 may ignore the feedback based on identifying that the previous transmission attempt associated with a transport block of the hybrid automatic repeat request process is for the configured grant and the LBT procedure failed for each transmission attempt of the transport block.

The counter manager 960 may initiate a counter associated with a hybrid automatic repeat request process for indicating that transmission attempts for a transport block of the hybrid automatic repeat request process are permitted. In some examples, the counter manager 960 may determine that the counter associated with the hybrid automatic repeat request process satisfies a threshold. In some examples, the counter manager 960 may increment the counter for each successful transmission associated with the hybrid automatic repeat request process performed by a user equipment. In some examples, the counter manager 960 may increment the counter for each transmission attempt associated with the hybrid automatic repeat request process performed by a user equipment.

The counter initiation manager 965 may perform a second transmission attempt associated with the hybrid automatic repeat request process over a second transmission occasion, the second transmission occasion occurs before the transmission occasion, where initiating the counter is based on performing the second transmission attempt. In some examples, the counter initiation manager 965 may transmit, successfully, a transport block associated with the hybrid automatic repeat request process over a second transmission occasion, the second transmission occasion occurring before the transmission occasion, where initiating the counter is based on successfully transmitting the transport block.

In some examples, the counter initiation manager 965 may determine whether initiating the counter is based on a second transmission attempt performed in response to the configured grant or a dynamic grant, where performing the transmission attempt is based on determining that initiating the counter is in response to the configured grant. In some cases, the second transmission attempt includes a first instance that a transport block of the HARQ process is attempted to be transmitted.

In some cases, the transmission of the transport block includes a first instance that the transport block of the HARQ process is successfully transmitted.

Figure 10:
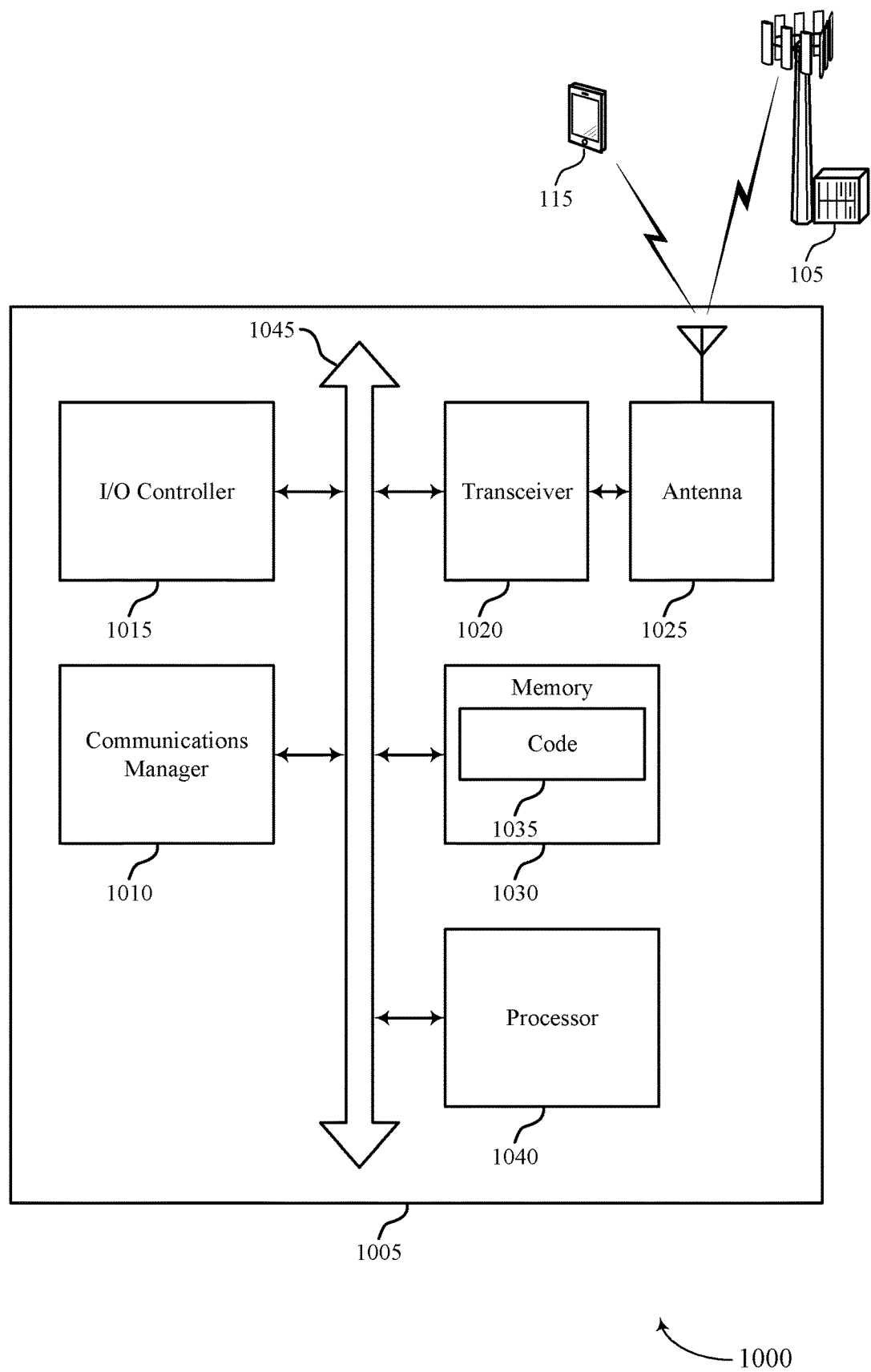
FIG. 10 shows a diagram of a system including a device that supports procedures for configured grants in accordance with aspects of the present disclosure.

FIG. 10 shows a diagram of a system 1000 including a device 1005 that supports procedures for configured grants in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may initiate a timer associated with a hybrid automatic repeat request process for indicating that transmission attempts for a transport block of the hybrid automatic repeat request process are permitted, identify a transmission occasion of a configured grant in an unlicensed frequency spectrum band that is associated with the hybrid automatic repeat request process, determine that the timer associated with the hybrid automatic repeat request process is active, and perform a transmission attempt of the transport block over the transmission occasion of the configured grant based on determining that the timer is active, where the transmission attempt includes a successful transmission or an unsuccessful transmission. The communications manager 1010 may also initiate a counter associated with a hybrid automatic repeat request process for indicating that transmission attempts for a transport block of the hybrid automatic repeat request process are permitted, determine that the counter associated with the hybrid automatic repeat request process satisfies a threshold, identify a transmission occasion of a configured grant in an unlicensed frequency spectrum band that is associated with the hybrid automatic repeat request process, and perform a transmission attempt of the transport block over the transmission occasion of the configured grant based on determining that the counter satisfies the threshold, where the transmission attempt includes a successful transmission or an unsuccessful transmission.

The communications manager 1010, or its sub-components, may be implemented in hardware, code (e.g., software or firmware) executed by a processor, or any combination thereof. If implemented in code executed by a processor, the functions of the communications manager 1010, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 1010, or its sub-components, may be physically located at various positions, including being distributed such that portions of functions are implemented at different physical locations by one or more physical components. In some examples, the communications manager 1010, or its sub-components, may be a separate and distinct component in accordance with various aspects of the present disclosure. In some examples, the communications manager 1010, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic input/output system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting procedures for configured grants).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
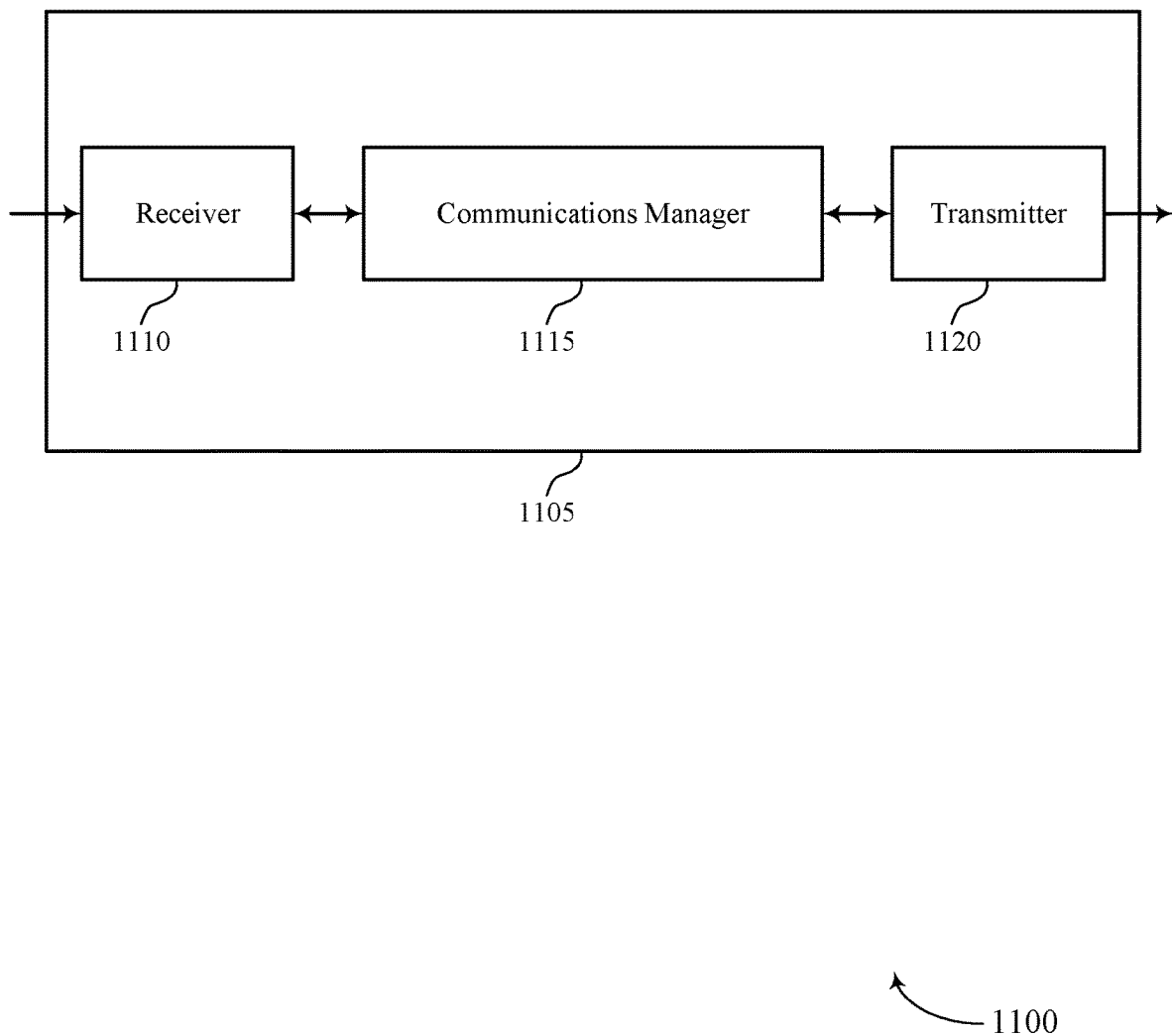
FIGS. 11 and 12 show block diagrams of devices that support procedures for configured grants in accordance with aspects of the present disclosure.

FIG. 11 shows a block diagram 1100 of a device 1105 that supports procedures for configured grants in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to procedures for configured grants). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may receive, from a user equipment, a transmission over a transmission opportunity of a configured grant in an unlicensed frequency spectrum band that is associated with a hybrid automatic repeat request process, schedule a retransmission of the transmission of a hybrid automatic repeat request from the hybrid automatic repeat request process based on the timer being active, identify that the transmission is a last transmission of the transport block of the hybrid automatic repeat request process received from the user equipment, and initiate a timer based on identifying that the transmission is the last transmission of the transport block of the hybrid automatic repeat request process received from the user equipment. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
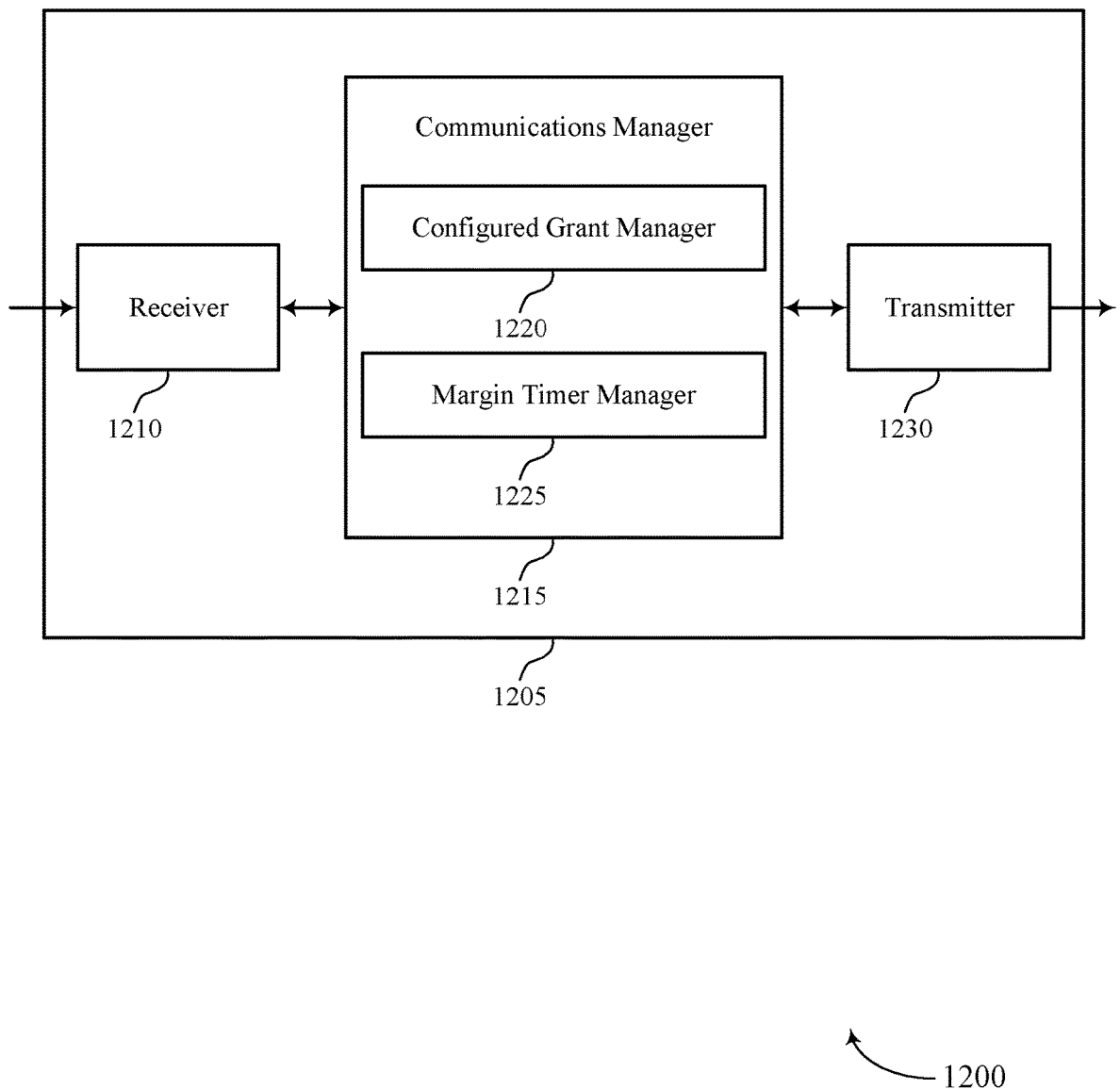

FIG. 12 shows a block diagram 1200 of a device 1205 that supports procedures for configured grants in accordance with aspects of the present disclosure. The device 1205 may be an example of aspects of a device 1105, or a base station 105 as described herein. The device 1205 may include a receiver 1210, a communications manager 1215, and a transmitter 1230. The device 1205 may also include a processor. Each of these components may be in communication with one another (e.g., via one or more buses).

The receiver 1210 may receive information such as packets, user data, or control information associated with various information channels (e.g., control channels, data channels, and information related to procedures for configured grants). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a configured grant manager 1220 and a margin timer manager 1225. The communications manager 1215 may be an example of aspects of the communications manager 1410 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The configured grant manager 1220 may receive, from a user equipment, a transmission of a transport block over a transmission opportunity of a configured grant in an unlicensed frequency spectrum band that is associated with a hybrid automatic repeat request process and schedule a retransmission of the transmission of a hybrid automatic repeat request from the hybrid automatic repeat request process based on the timer being active.

The margin timer manager 1225 may identify that the transmission is a last transmission of the transport block of the hybrid automatic repeat request process received from the user equipment and initiate a timer based on identifying that the transmission is the last transmission of the transport block of the hybrid automatic repeat request process received from the user equipment.

The transmitter 1230 may transmit signals generated by other components of the device 1205. In some examples, the transmitter 1230 may be collocated with a receiver 1210 in a transceiver module. For example, the transmitter 1230 may be an example of aspects of the transceiver 1420 described with reference to FIG. 14. The transmitter 1230 may utilize a single antenna or a set of antennas.

Figure 13:
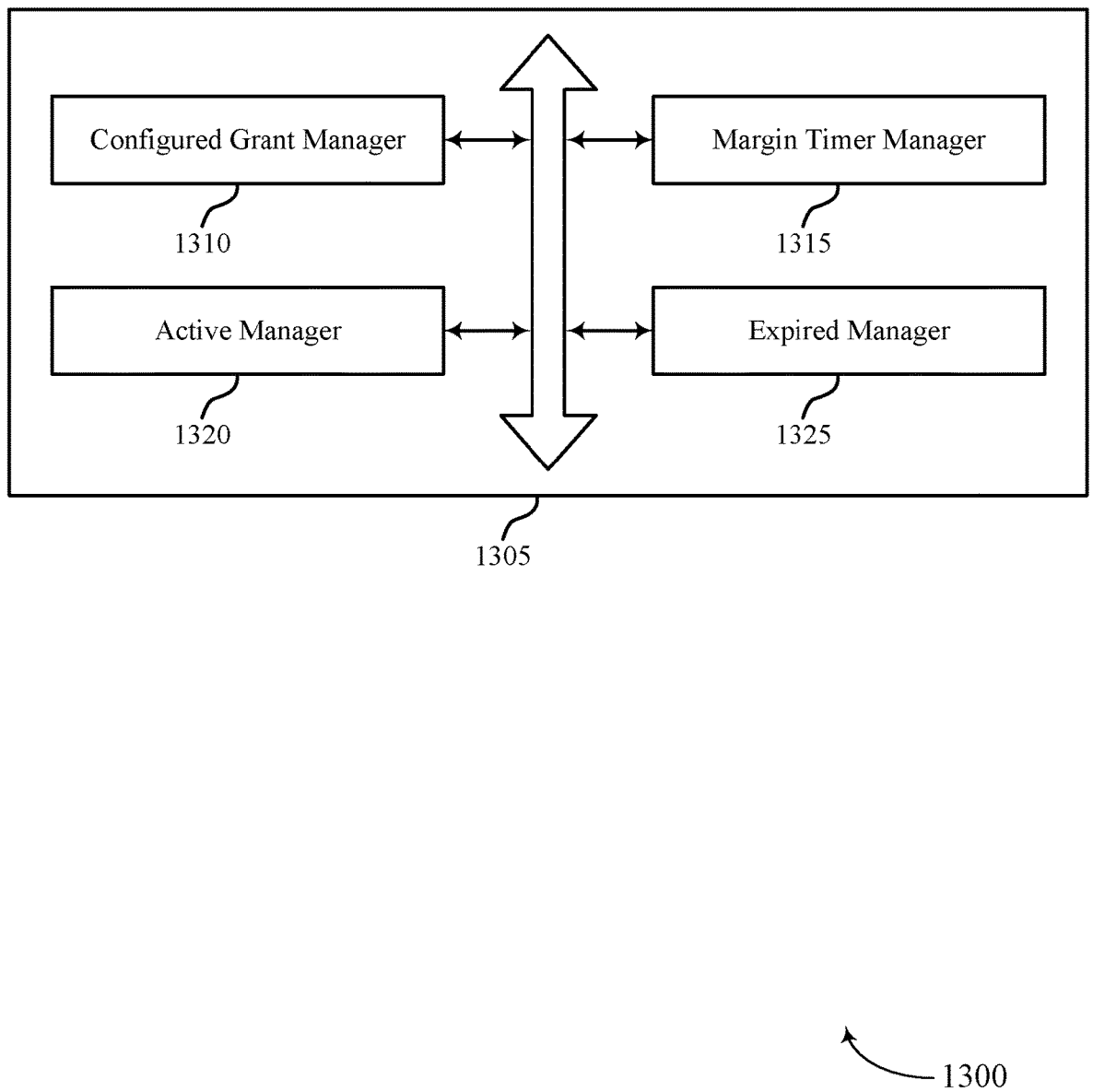
FIG. 13 shows a block diagram of a communications manager that supports procedures for configured grants in accordance with aspects of the present disclosure.

FIG. 13 shows a block diagram 1300 of a communications manager 1305 that supports procedures for configured grants in accordance with aspects of the present disclosure. The communications manager 1305 may be an example of aspects of a communications manager 1115, a communications manager 1215, or a communications manager 1410 described herein. The communications manager 1305 may include a configured grant manager 1310, a margin timer manager 1315, an active manager 1320, and an expired manager 1325. Each of these modules may communicate, directly or indirectly, with one another (e.g., via one or more buses).

The communications manager 1305, or its sub-components, may be implemented in hardware, code (e.g., software or firmware) executed by a processor, or any combination thereof. If implemented in code executed by a processor, the functions of the communications manager 1305, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1305, or its sub-components, may be physically located at various positions, including being distributed such that portions of functions are implemented at different physical locations by one or more physical components. In some examples, the communications manager 1305, or its sub-components, may be a separate and distinct component in accordance with various aspects of the present disclosure. In some examples, the communications manager 1305, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The configured grant manager 1310 may receive, from a user equipment, a transmission of a transport block over a transmission opportunity of a configured grant in an unlicensed frequency spectrum band that is associated with a hybrid automatic repeat request process.

In some examples, the configured grant manager 1310 may schedule a retransmission of the transmission of a hybrid automatic repeat request from the hybrid automatic repeat request process based on the timer being active.

The margin timer manager 1315 may identify that the transmission is a last transmission of the hybrid automatic repeat request process received from the user equipment. In some examples, the margin timer manager 1315 may initiate a timer based on identifying that the transmission is the last transmission of the transport block of the hybrid automatic repeat request process received from the user equipment. In some cases, the timer includes a retransmission timer. In some cases, a duration of the timer is for allowing the base station to schedule the retransmission or acknowledgment of a first transport block associated with the hybrid automatic repeat request process without overriding a second transport block associated with the hybrid automatic repeat request process by the user equipment.

The active manager 1320 may identify that the timer is active, where scheduling the retransmission is based on the timer being active.

The expired manager 1325 may identify that the timer is expired. In some examples, the expired manager 1325 may terminate the hybrid automatic repeat request process based on identifying that the timer is expired.

Figure 14:
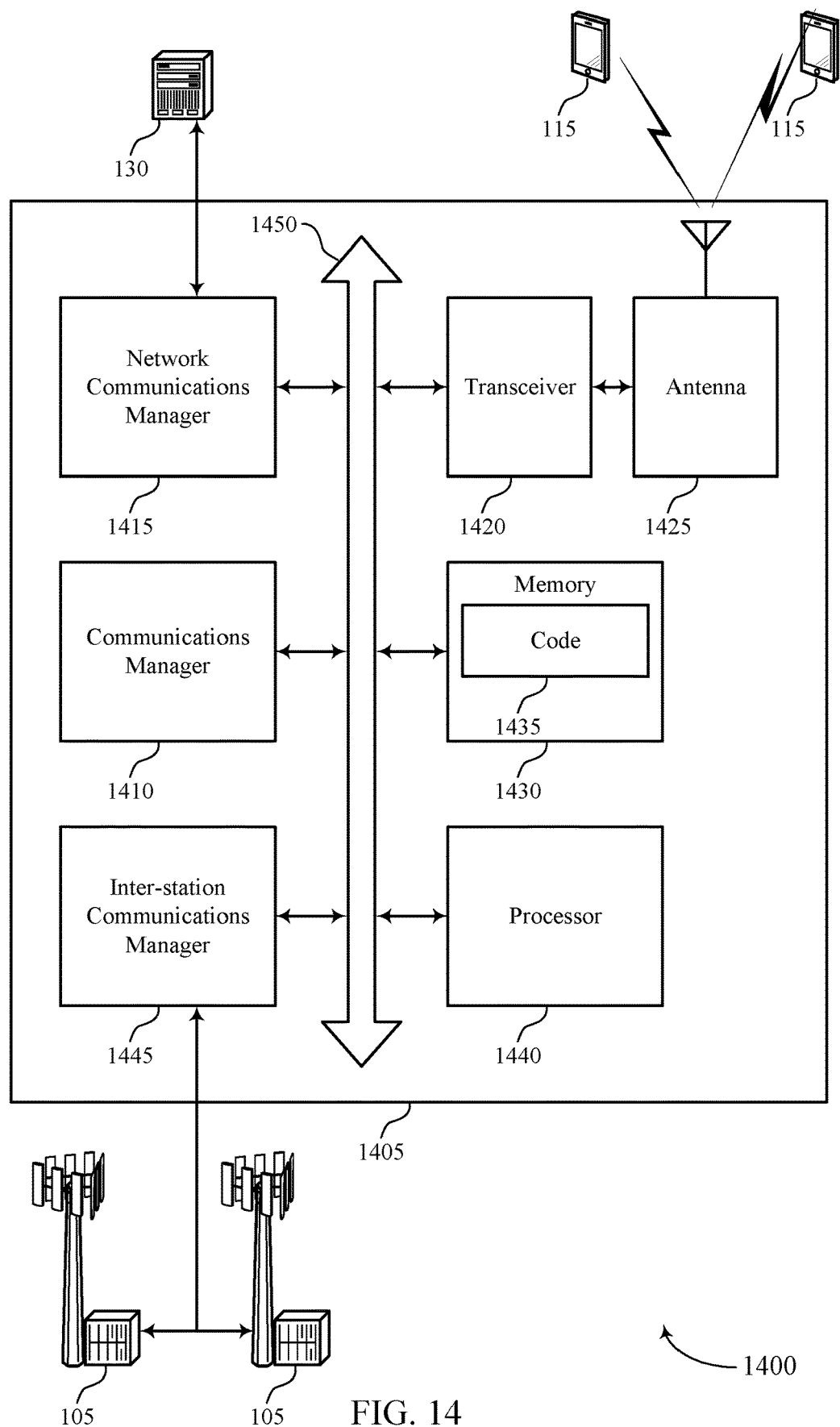
FIG. 14 shows a diagram of a system including a device that supports procedures for configured grants in accordance with aspects of the present disclosure.

FIG. 14 shows a diagram of a system 1400 including a device 1405 that supports procedures for configured grants in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may receive, from a user equipment, a transmission of a transport block over a transmission opportunity of a configured grant in an unlicensed frequency spectrum band that is associated with a hybrid automatic repeat request process, schedule a retransmission of the transmission of a hybrid automatic repeat request from the hybrid automatic repeat request process based on the timer being active, identify that the transmission is a last transmission of the transport block of the hybrid automatic repeat request process received from the user equipment, and initiate a timer based on identifying that the transmission is the last transmission of the transport block of the hybrid automatic repeat request process received from the user equipment.

The communications manager 1410, or its sub-components, may be implemented in hardware, code (e.g., software or firmware) executed by a processor, or any combination thereof. If implemented in code executed by a processor, the functions of the communications manager 1410, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1410, or its sub-components, may be physically located at various positions, including being distributed such that portions of functions are implemented at different physical locations by one or more physical components. In some examples, the communications manager 1410, or its sub-components, may be a separate and distinct component in accordance with various aspects of the present disclosure. In some examples, the communications manager 1410, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting procedures for configured grants).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
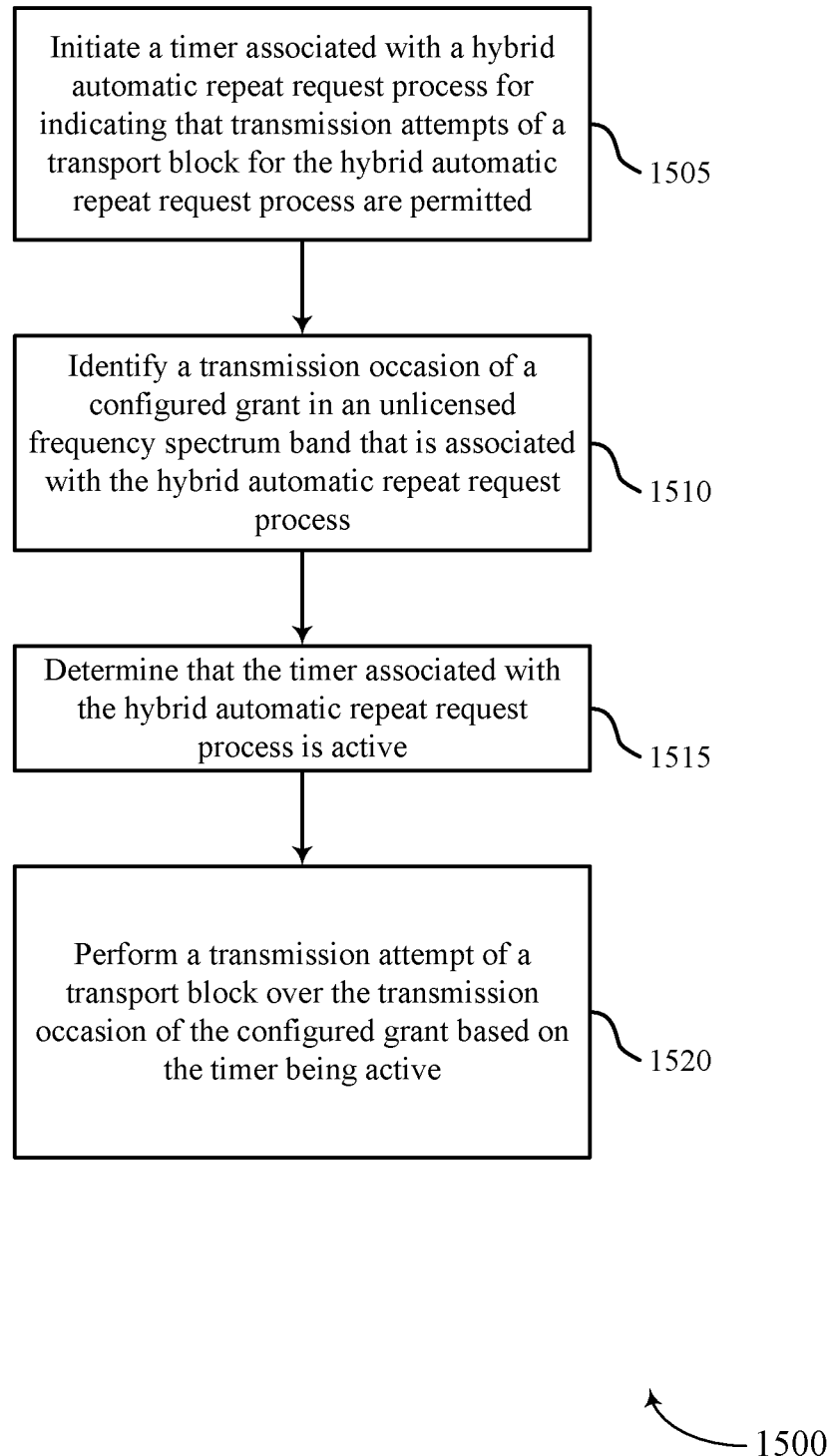
FIGS. 15 through 17 show flowcharts illustrating methods that support procedures for configured grants in accordance with aspects of the present disclosure.

FIG. 15 shows a flowchart illustrating a method 1500 that supports procedures for configured grants in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may initiate a timer associated with a hybrid automatic repeat request process for indicating that transmission attempts of a transport block for the hybrid automatic repeat request process are permitted. The operations of 1505 may be performed according to the methods described herein. In some examples, aspects of the operations of 1505 may be performed by a timer manager as described with reference to FIGS. 7 through 10.

At 1510, the UE may identify a transmission occasion of a configured grant in an unlicensed frequency spectrum band that is associated with the hybrid automatic repeat request process. The operations of 1510 may be performed according to the methods described herein. In some examples, aspects of the operations of 1510 may be performed by a configured grant manager as described with reference to FIGS. 7 through 10.

At 1515, the UE may determine that the timer associated with the hybrid automatic repeat request process is active. The operations of 1515 may be performed according to the methods described herein. In some examples, aspects of the operations of 1515 may be performed by a configured grant manager as described with reference to FIGS. 7 through 10.

At 1520, the UE may perform a transmission attempt of the transport block over the transmission occasion of the configured grant based on the timer being active. The operations of 1520 may be performed according to the methods described herein. In some examples, aspects of the operations of 1520 may be performed by a transmission attempt manager as described with reference to FIGS. 7 through 10.

Figure 16:
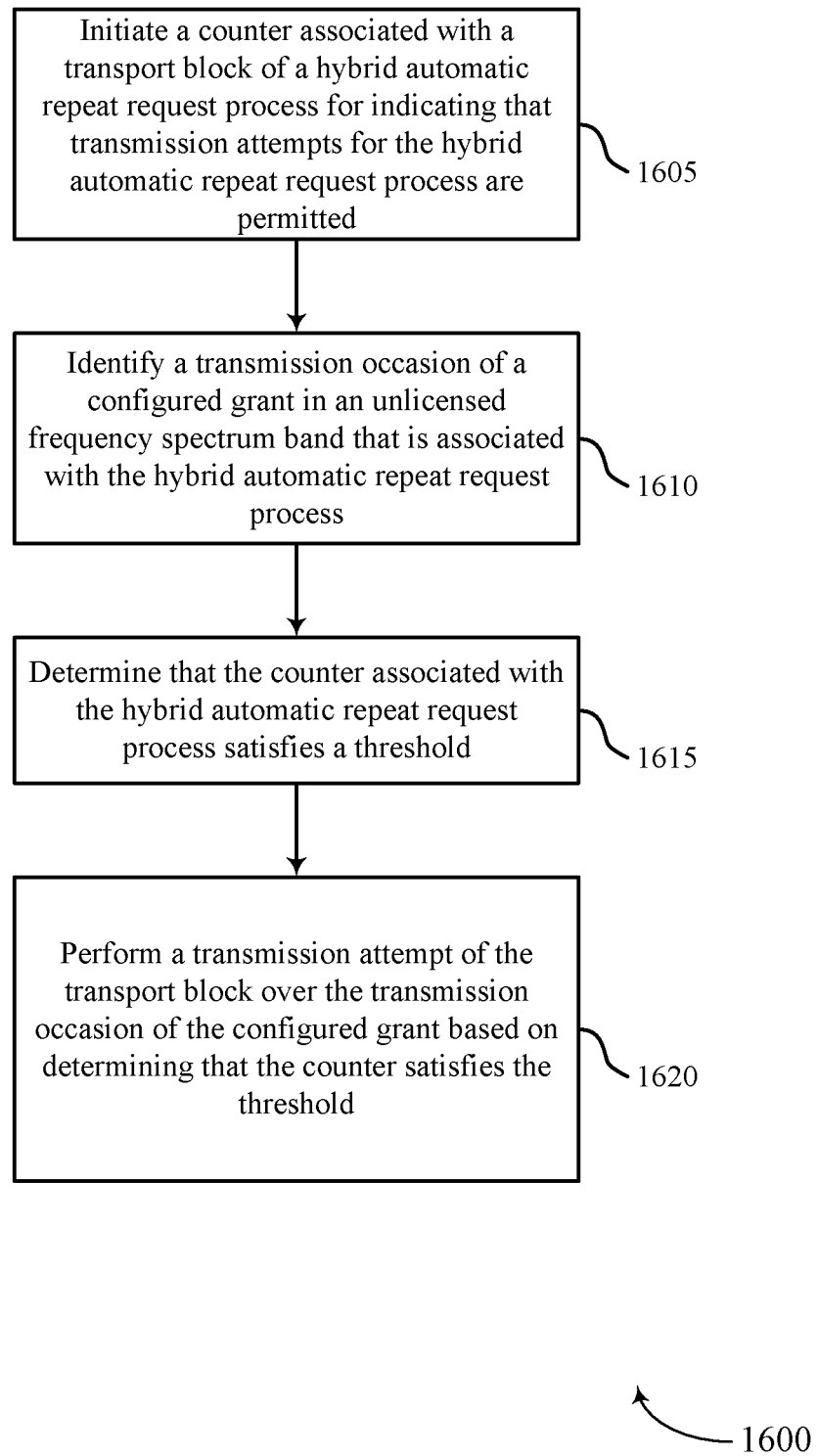

FIG. 16 shows a flowchart illustrating a method 1600 that supports procedures for configured grants in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may initiate a counter associated with a transport block of a hybrid automatic repeat request process for indicating that transmission attempts for the hybrid automatic repeat request process are permitted. The operations of 1605 may be performed according to the methods described herein. In some examples, aspects of the operations of 1605 may be performed by a counter manager as described with reference to FIGS. 7 through 10.

At 1610, the UE may identify a transmission occasion of a configured grant in an unlicensed frequency spectrum band that is associated with the hybrid automatic repeat request process. The operations of 1610 may be performed according to the methods described herein. In some examples, aspects of the operations of 1610 may be performed by a configured grant manager as described with reference to FIGS. 7 through 10.

At 1615, the UE may determine that the counter associated with the hybrid automatic repeat request process satisfies a threshold. The operations of 1615 may be performed according to the methods described herein. In some examples, aspects of the operations of 1615 may be performed by a counter manager as described with reference to FIGS. 7 through 10.

At 1620, the UE may perform a transmission attempt of the transport block over the transmission occasion of the configured grant based on determining that the counter satisfies the threshold. The operations of 1620 may be performed according to the methods described herein. In some examples, aspects of the operations of 1620 may be performed by a transmission attempt manager as described with reference to FIGS. 7 through 10.

Figure 17:
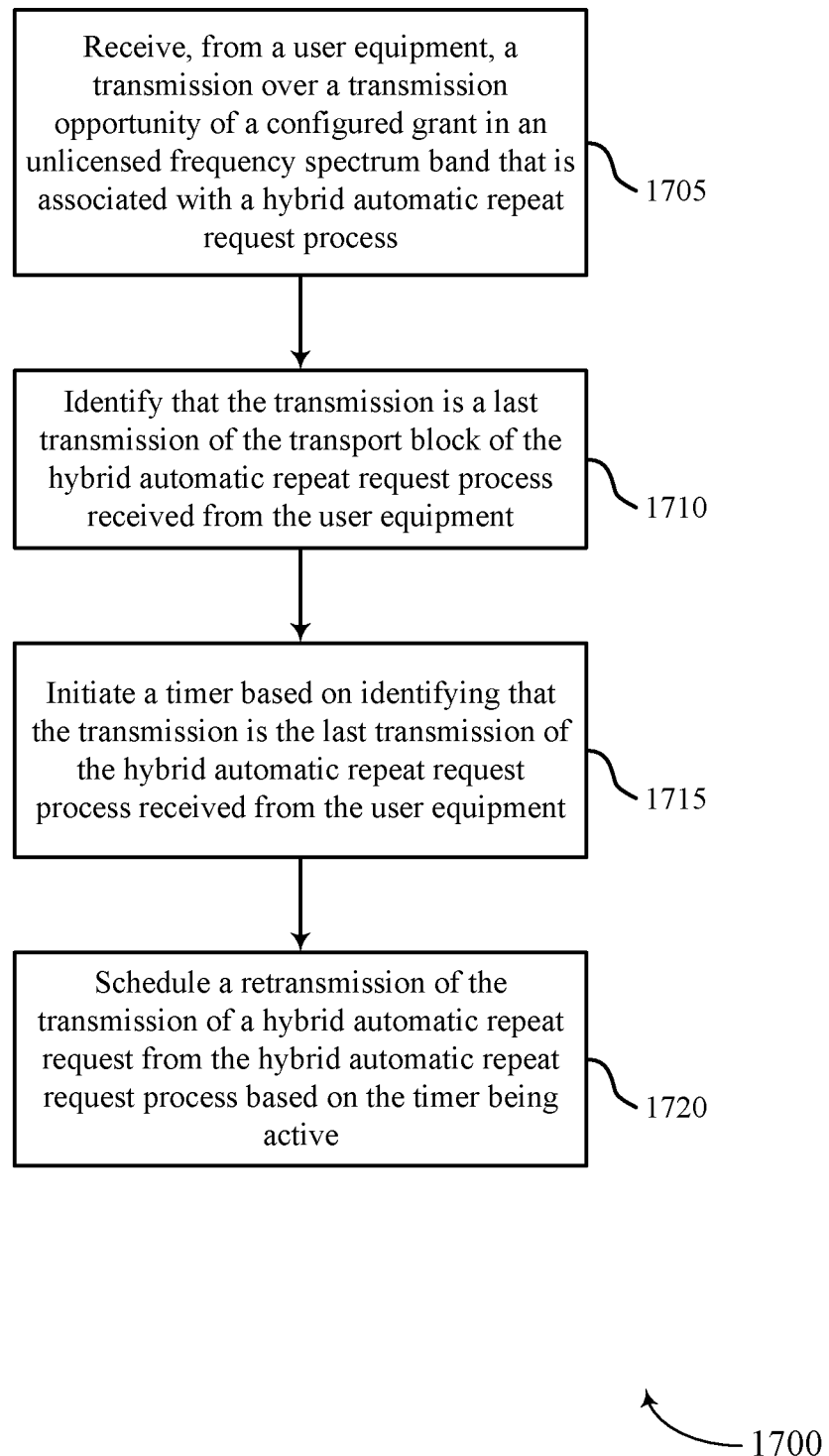

FIG. 17 shows a flowchart illustrating a method 1700 that supports procedures for configured grants in accordance with aspects of the present disclosure. The operations of method 1700 may be implemented by a base station 105 or its components as described herein. For example, the operations of method 1700 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1705, the base station may receive, from a user equipment, a transmission over a transmission opportunity of a configured grant in an unlicensed frequency spectrum band that is associated with a hybrid automatic repeat request process. The operations of 1705 may be performed according to the methods described herein. In some examples, aspects of the operations of 1705 may be performed by a configured grant manager as described with reference to FIGS. 11 through 14.

At 1710, the base station may identify that the transmission is a last transmission of the transport block of the hybrid automatic repeat request process received from the user equipment. The operations of 1710 may be performed according to the methods described herein. In some examples, aspects of the operations of 1710 may be performed by a margin timer manager as described with reference to FIGS. 11 through 14.

At 1715, the base station may initiate a timer based on identifying that the transmission is the last transmission of the hybrid automatic repeat request process received from the user equipment. The operations of 1715 may be performed according to the methods described herein. In some examples, aspects of the operations of 1715 may be performed by a margin timer manager as described with reference to FIGS. 11 through 14.

At 1720, the base station may schedule a retransmission of the transmission of a hybrid automatic repeat request from the hybrid automatic repeat request process based on the timer being active. The operations of 1720 may be performed according to the methods described herein. In some examples, aspects of the operations of 1720 may be performed by a configured grant manager as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    initiating a timer associated with a hybrid automatic repeat request process for indicating that transmission attempts for a transport block of the hybrid automatic repeat request process are permitted;
    receiving signaling that indicates a periodicity of transmission occasions of a configured grant;
    identifying a transmission occasion of the configured grant in an unlicensed frequency spectrum band that is associated with the hybrid automatic repeat request process based at least in part on the received signaling;
    determining that the timer associated with the hybrid automatic repeat request process is active; and
    performing a transmission attempt of the transport block over the transmission occasion of the configured grant based at least in part on the timer being active.

2. The method of claim 1, wherein performing the transmission attempt is based at least in part on the timer being initiated in response to the configured grant.

3. The method of claim 1, wherein performing the transmission attempt is based at least in part on a previous transmission attempt being in response to the configured grant.

4. The method of claim 1, further comprising:
    performing a second transmission attempt of the transport block of the hybrid automatic repeat request process over a second transmission occasion, wherein the second transmission occasion occurs before the transmission occasion, and wherein initiating the timer is based at least in part on performing the second transmission attempt.

5. The method of claim 4, wherein the second transmission attempt comprises a first instance that the transport block of the hybrid automatic repeat request process is attempted to be transmitted.

6. The method of claim 1, further comprising:
transmitting, successfully, the transport block of the hybrid automatic repeat request process over a second transmission occasion, the second transmission occasion occurring before the transmission occasion, wherein initiating the timer is based at least in part on successfully transmitting the transport block.

7. The method of claim 6, wherein the transmission of the transport block comprises a first instance that the transport block of the hybrid automatic repeat request process is successfully transmitted.

8. The method of claim 1, further comprising:
identifying a duration of the timer based at least in part on the transmission occasion being for the configured grant, wherein initiating the timer is based at least in part on identifying the duration.

9. The method of claim 8, wherein a second duration of the timer associated with the transmission occasion is for a dynamic grant and is different than the duration associated with the transmission occasion for the configured grant.

10. The method of claim 1, further comprising:
identifying that the timer is expired; and
terminating the hybrid automatic repeat request process based at least in part on identifying that the timer is expired.

11. The method of claim 1, further comprising:
receiving a dynamic grant associated with the hybrid automatic repeat request process or an acknowledgment associated with the hybrid automatic repeat request process; and
resetting the timer associated with the hybrid automatic repeat request process based at least in part on receiving the dynamic grant or the acknowledgment.

12. The method of claim 1, further comprising:
performing a listen-before-talk procedure on resources associated with the transmission occasion, wherein performing the transmission attempt is based at least in part on performing the listen-before-talk procedure.

13. The method of claim 1, further comprising:
generating a second transport block for the transmission occasion, wherein performing the transmission attempt comprises attempting to transmit the second transport block over resources associated with the transmission occasion.

14. The method of claim 1, further comprising:
receiving, from a base station, an uplink grant requesting that the transport block of the hybrid automatic repeat request process be retransmitted;
determining, by a user equipment, that the uplink grant is not associated with a second transport block used during a previous transmission attempt associated with the hybrid automatic repeat request process; and
discarding the uplink grant based at least in part on determining that the uplink grant is not associated with the second transport block used during the previous transmission attempt associated with the hybrid automatic repeat request process.

15. The method of claim 14, wherein determining that the uplink grant is not associated with the second transport block used during the previous transmission attempt associated with the hybrid automatic repeat request process further comprises:
identifying, by the user equipment, that the second transport block associated with the hybrid automatic repeat request process by the user equipment is different than the transport block indicated in the uplink grant.

16. The method of claim 14, wherein determining that the uplink grant is not associated with the second transport block used during the previous transmission attempt associated with the hybrid automatic repeat request process further comprises:
identifying, by the user equipment, that a first size of the second transport block associated with the hybrid automatic repeat request process by the user equipment is different than a second size of the transport block indicated in the uplink grant.

17. The method of claim 14, wherein determining that the uplink grant is not associated with the second transport block used during the previous transmission attempt associated with the hybrid automatic repeat request process further comprises:
identifying that a dynamic grant indicated by the uplink grant as being associated with the previous transmission attempt of the hybrid automatic repeat request process is different than the configured grant associated with the previous transmission attempt of the hybrid automatic repeat request process by the user equipment.

18. The method of claim 14, wherein determining that the uplink grant is not associated with the second transport block used during the previous transmission attempt associated with the hybrid automatic repeat request process further comprises:
identifying that a first modulation and coding scheme indicated by the uplink grant is different than a second modulation and coding scheme associated with the previous transmission attempt of the hybrid automatic repeat request process.

19. The method of claim 1, further comprising:
identifying that the transmission attempt is a last transmission attempt of the transport block of the hybrid automatic repeat request process;
initiating a second timer based at least in part on identifying that the transmission attempt is the last transmission attempt; and
terminating the hybrid automatic repeat request process after the second timer expires.

20. The method of claim 19, wherein the second timer comprises a retransmission timer.

21. The method of claim 1, further comprising:
receiving, from a base station, feedback about the hybrid automatic repeat request process;
identifying a first new data indicator of a previous transmission attempt of the transport block of the hybrid automatic repeat request process; and
determining whether the first new data indicator matches a second new data indicator included in the feedback from the base station.

22. The method of claim 21, further comprising:
performing an action indicated by the feedback based at least in part on determining that the first new data indicator matches the second new data indicator; or
ignoring the feedback based at least in part on determining that the first new data indicator does not match the second new data indicator.

23. The method of claim 22, wherein performing the action further comprises:
  configuring the hybrid automatic repeat request process with a second transport block based at least in part on the feedback comprising an acknowledgment.

24. The method of claim 23, wherein performing the action further comprises:
  retransmitting the transport block based at least in part on the feedback comprising a negative acknowledgment.

25. The method of claim 1, further comprising:
  receiving, from a base station, feedback about the hybrid automatic repeat request process;
  identifying that a previous transmission attempt of the transport block associated with the hybrid automatic repeat request process is for the configured grant and a listen-before-talk procedure associated with the previous transmission attempt failed; and
  ignoring the feedback based at least in part on identifying that the previous transmission attempt associated with the hybrid automatic repeat request process is for the configured grant and the listen-before-talk procedure failed.

26. The method of claim 1, wherein the timer comprises a configured grant timer.

27. An apparatus for wireless communication, comprising:
  a processor,
  memory in electronic communication with the processor; and
  instructions stored in the memory and executable by the processor to cause the apparatus to:
    initiate a timer associated with a hybrid automatic repeat request process for indicating that transmission attempts for a transport block of the hybrid automatic repeat request process are permitted;
    receive signaling that indicates a periodicity of transmission occasions of a configured grant;
    identify a transmission occasion of the configured grant in an unlicensed frequency spectrum band that is associated with the hybrid automatic repeat request process based at least in part on the received signaling;
    determine that the timer associated with the hybrid automatic repeat request process is active; and
    perform a transmission attempt of the transport block over the transmission occasion of the configured grant based at least in part on determining that the timer is active.

28. The apparatus of claim 27, further comprising an antenna, or a display, or a user interface, or a combination thereof.

29. An apparatus for wireless communication, comprising:
  means for initiating a timer associated with a hybrid automatic repeat request process for indicating that transmission attempts for a transport block of the hybrid automatic repeat request process are permitted;
  means for receiving signaling that indicates a periodicity of transmission occasions of a configured grant;
  means for identifying a transmission occasion of the configured grant in an unlicensed frequency spectrum band that is associated with the hybrid automatic repeat request process based at least in part on the received signaling;
  means for determining that the timer associated with the hybrid automatic repeat request process is active; and
  means for performing a transmission attempt of the transport block over the transmission occasion of the configured grant based at least in part on determining that the timer is active.

30. A non-transitory computer-readable medium storing code for wireless communication, the code comprising instructions executable by a processor to:
  initiate a timer associated with a hybrid automatic repeat request process for indicating that transmission attempts for a transport block of the hybrid automatic repeat request process are permitted;
  receive signaling that indicates a periodicity of transmission occasions of a configured grant;
  identify a transmission occasion of the configured grant in an unlicensed frequency spectrum band that is associated with the hybrid automatic repeat request process based at least in part on the received signaling;
  determine that the timer associated with the hybrid automatic repeat request process is active; and
  perform a transmission attempt of the transport block over the transmission occasion of the configured grant based at least in part on determining that the timer is active.

31. The method of claim 1, further comprising:
  determining that a second timer associated with retransmissions of the hybrid automatic repeat request process is expired, wherein performing the transmission attempt of the transport block over the transmission occasion of the configured grant is based at least in part on determining that the second timer is expired.

* * * * *